(12) United States Patent
Chuah et al.

(10) Patent No.: US 10,219,013 B2
(45) Date of Patent: Feb. 26, 2019

(54) METHOD AND APPARATUS FOR REDUCING DATA BANDWIDTH BETWEEN A CLOUD SERVER AND A THIN CLIENT

(71) Applicant: Singapore University of Technology and Design, Singapore (SG)

(72) Inventors: Seong Ping Chuah, Singapore (SG); Ngai-Man Cheung, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 161 days.

(21) Appl. No.: 15/108,264

(22) PCT Filed: Dec. 24, 2014

(86) PCT No.: PCT/SG2014/000618
§ 371 (c)(1),
(2) Date: Jun. 24, 2016

(87) PCT Pub. No.: WO2015/099613
PCT Pub. Date: Jul. 2, 2015

(65) Prior Publication Data
US 2016/0330493 A1     Nov. 10, 2016

(30) Foreign Application Priority Data
Dec. 26, 2013    (SG) ............................... 201309701-9

(51) Int. Cl.
*H04N 7/173*    (2011.01)
*H04N 21/2385*    (2011.01)
(Continued)

(52) U.S. Cl.
CPC ......... *H04N 21/2385* (2013.01); *A63F 13/25* (2014.09); *A63F 13/355* (2014.09);
(Continued)

(58) Field of Classification Search
CPC ............ H04N 21/2662; H04N 21/637; H04N 21/4781; H04N 21/8146
(Continued)

(56) References Cited

U.S. PATENT DOCUMENTS 8,908,005 B1 *  12/2014  Leske ................... H04N 7/152
                                                348/14.09
8,982,122 B2 *   3/2015  Corazza ................. G06T 17/20
                                                345/423
(Continued)

FOREIGN PATENT DOCUMENTS

WO         9830015        7/1998
WO     2015099613 A1      7/2015

OTHER PUBLICATIONS

Foreign Communication from a Related Counterpart—International Search Report and Written Opinion, dated Mar. 31, 2015, PCT/SG2014/000618, filed on Dec. 24, 2014.
(Continued)

*Primary Examiner* — Pankaj Kumar
*Assistant Examiner* — Sahar Aqil Riaz

(57) ABSTRACT

The present invention relates to a method for reducing data bandwidth between a cloud server and a thin client. The method comprises: rendering a base layer image or video stream at the thin client, transmitting an enhancement layer image or video stream from the cloud server to the thin client, displaying a composite layer image or video stream on the thin client, the composite layer being based on the base layer and the enhancement layer.

29 Claims, 15 Drawing Sheets

(51) Int. Cl.
*G06T 15/04* (2011.01)
*G06T 15/80* (2011.01)
*G06T 17/20* (2006.01)
*H04N 21/2662* (2011.01)
*H04N 21/637* (2011.01)
*A63F 13/355* (2014.01)
*A63F 13/25* (2014.01)
*H04B 1/3827* (2015.01)
*H04L 12/24* (2006.01)
*H04L 29/08* (2006.01)
*H04N 21/478* (2011.01)
*H04N 21/81* (2011.01)

(52) U.S. Cl.
CPC .............. *G06T 15/04* (2013.01); *G06T 15/80* (2013.01); *G06T 17/20* (2013.01); *H04B 1/3827* (2013.01); *H04L 41/12* (2013.01); *H04L 67/10* (2013.01); *H04N 21/2662* (2013.01); *H04N 21/4781* (2013.01); *H04N 21/637* (2013.01); *H04N 21/8146* (2013.01); *G06T 2200/16* (2013.01); *G06T 2210/08* (2013.01)

(58) Field of Classification Search
USPC .............................................. 725/70, 98, 118
See application file for complete search history.

(56) References Cited

U.S. PATENT DOCUMENTS

| | | | |
|---|---|---|---|
| 9,055,139 | B1* | 6/2015 | Devireddy ............. H04L 67/42 |
| 9,101,279 | B2* | 8/2015 | Ritchey .................. G03B 37/00 |
| 2004/0261113 | A1* | 12/2004 | Paul ............... H04N 21/234327 |
| | | | 725/90 |
| 2009/0217338 | A1* | 8/2009 | Quigley ............ H04N 7/17309 |
| | | | 725/118 |
| 2010/0303146 | A1 | 12/2010 | Kamay |
| 2014/0019583 | A1* | 1/2014 | Sethuraman .......... H04L 65/601 |
| | | | 709/217 |
| 2014/0095123 | A1* | 4/2014 | Patnaik .............. G01N 33/0075 |
| | | | 703/2 |
| 2015/0123973 | A1* | 5/2015 | Larsen .................... G06T 15/04 |
| | | | 345/427 |
| 2016/0035127 | A1* | 2/2016 | Ishibashi ............... G06T 15/005 |
| | | | 345/419 |
| 2016/0286239 | A1* | 9/2016 | Sato ....................... H04N 19/70 |

OTHER PUBLICATIONS

Foreign Communication from a Related Counterpart—International Preliminary Report on Patentability, dated Nov. 24, 2015, PCT/SG2014/000618, filed on Dec. 24, 2014.
Levoy, Marc, entitled "Polygon-Assited JPEG and MPEG Compression of Synthetic Images," 1995, ACM-0-89791-701-4/95/008.

* cited by examiner (a)

(b)

(a)

(b)

METHOD AND APPARATUS FOR REDUCING DATA BANDWIDTH BETWEEN A CLOUD SERVER AND A THIN CLIENT

CROSS-REFERENCE TO RELATED APPLICATIONS

The present application is a filing under 35 U.S.C. 371 as the National Stage of International Application No. PCT/SG2014/000618, filed Dec. 24, 2014, entitled "A METHOD AND APPARATUS FOR REDUCING DATA BANDWIDTH BETWEEN A CLOUD SERVER AND A THIN CLIENT," which claims the benefit of and priority to Singapore Application No. 201309701-9, filed with the Intellectual Property Office of Singapore on Dec. 26, 2013, both of which are incorporated herein by reference in their entirety for all purposes.

FIELD OF THE INVENTION

The present invention relates to a method and apparatus for reducing data bandwidth between a cloud server and a thin client. The method and apparatus may be used for cloud gaming.

BACKGROUND OF THE INVENTION

With the advances of cloud computing and multimedia communication, cloud gaming has been proposed to enable rich multiplayer Internet games. In a cloud gaming platform, control and button inputs from the client are transmitted to the server. In response, the server renders and compresses the game images, and transmits them to the client display. In other words, computationally-intensive rendering and game logics are executed on the powerful cloud servers instead of client terminals.

Cloud gaming can offer several advantages. Since the games are rendered and managed on the powerful servers, users can play rich multiplayer games using low-end consoles or power-constrained mobile devices. Cloud gaming has the potential to transform any handheld device into a powerful gaming machine, enabling photo-realistic game content on mobile clients. Furthermore, as the games are stored on the servers, cloud gaming can effectively address the piracy issue and simplify distribution. In addition, the cloud gaming platform is deemed to be particularly suitable for serious games such as rehabilitation games or educational games. As game logic resides in the cloud, cloud gaming can greatly facilitate performance monitoring, customization for individual need and timely feedback, which are preferably present for serious games.

With its potential advantages, cloud gaming has attracted a lot of interests recently. For example, Sony purchased cloud gaming services from a platform provider called Gaikai in 2012 [27], and will be incorporating some cloud gaming functionalities into its game consoles [28]. Samsung has announced plans to stream games to its Smart TVs [6]. This allows users to access popular game titles without the need for game consoles. Recently, NVIDIA has also developed powerful server-side rendering boards, with a brand name GRID [19], which include massively parallel rendering engines of up to 3072 processing cores per board, and are capable of supporting up to 24 concurrent game users per board.

Despite the advantages and strong industrial interests, cloud gaming faces some of the most stringent challenges for multimedia communication. With the technology to date, first, computation-intensive rendering and game content compression need to be performed for individual users at the cloud servers in real-time. Second, high-quality, high-frame-rate graphics of immense data-size need to be streamed under stringent latency requirements. Third, existing cloud gaming requires user bandwidths as high as several gigabytes per hour data download rates. In other words, bandwidth consumption and latency are two main challenges of current cloud gaming. This prohibits widespread adoption in many regions with usage-based Internet billing. While the computation challenge may be addressed by recently-developed cost/power-efficient rendering hardware, the latency and bandwidth challenges remain highly difficult. Currently, almost all existing cloud gaming services require users to have high-bandwidth dedicated connections. Mobile cloud gaming services, which stream game contents over wireless networks, are rare.

Most existing cloud gaming platforms employ standard, off-the-shelf video codecs for game image compression, notably H.264/MPEG-4 Part 10 Advanced Video Coding (AVC) [33]. H.264 and the recently standardized High Efficiency Video Coding (HEVC)/H.265 video coding [29] rely strongly on inter-frame correlation to reduce the source bitrate. Many games (e.g., first person shooter games), however, exhibit rapid camera motion and their temporal correlation tends to be small. This affects the compression performance. In addition, high-quality games demand crisp details and pristine content quality, and these require very high transmission bit-rates with the state-of-the-art video compression technology.

SUMMARY OF THE INVENTION

The present invention aims to provide a new and useful method and apparatus for reducing data bandwidth between a cloud server and a thin client.

A first aspect of the present invention is a method for reducing data bandwidth between a cloud server and a thin client comprising: rendering a base layer image or video stream at the thin client, transmitting an enhancement layer image or video stream from the cloud server to the thin client, displaying a composite layer image or video stream on the thin client, the composite layer being based on the base layer and the enhancement layer.

The word "thin" above is used to mean that the client has lower computational capability than the cloud server. This thin client may be a mobile device or any other user device.

The method can help reduce the transmission bandwidth required between the cloud server and the thin client and yet, still achieve a high quality display on the thin client. This is because the enhancement layer transmitted to the thin client can be used to improve the quality of the base layer rendered at the thin client. The composite layer displayed on the thin client is thus of a sufficiently high quality.

A second aspect of the present invention is an apparatus comprising: a processor configured to render a base layer image or video stream, a receiver configured to receive an enhancement layer image or video stream from a cloud server, the cloud server having higher computational capability than the apparatus; and a display unit configured to display a composite layer image or video stream on the apparatus, the composite layer being based on the base layer and the enhancement layer.

A third aspect of the present invention is a cloud server comprising: a processor configured to render a high quality layer image or video stream and a base layer image or video stream, wherein the high quality layer has a higher quality than the base layer and wherein the processor is further configured to generate an enhancement layer from the high quality layer and the base layer, and a transmitter configured to transmit the enhancement layer to a thin client having lower computational capability than the cloud server.

BRIEF DESCRIPTION OF THE FIGURES

Embodiments of the invention will now be illustrated for the sake of example only with reference to the following drawings, in which.

DETAILED DESCRIPTION OF THE EMBODIMENTS

1. Method 100

Figure 1:
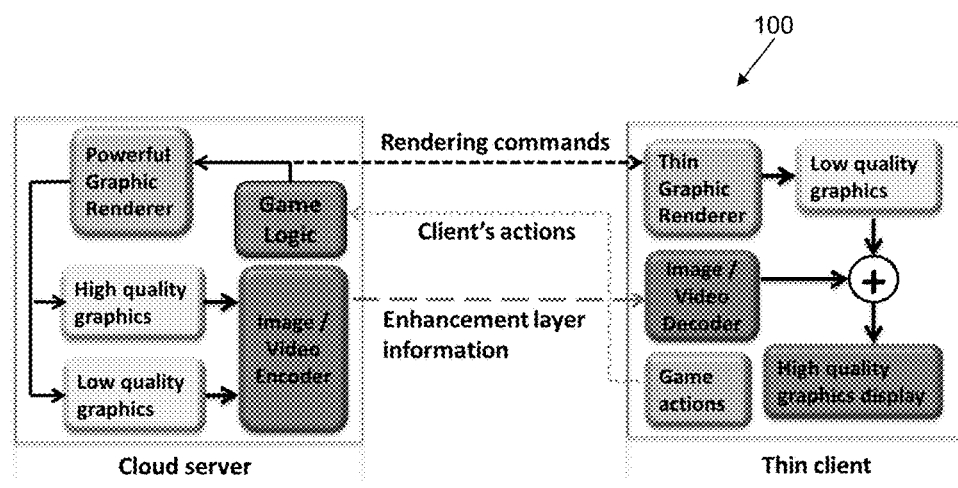
FIG. 1 shows a method for reducing data bandwidth between a cloud server and a thin client according to an embodiment of the present invention.

FIG. 1 shows a method 100 for reducing data bandwidth between a cloud server and a thin client according to an embodiment of the present invention. In FIG. 1, the method 100 is used for mobile cloud gaming and can thus be referred to as a mobile cloud gaming framework. The thin client (which may be a mobile device) has some computation capability for rendering and image/video processing but this computation capability is not sufficient for supporting the rendering of high quality video games locally. On the other hand, the cloud server is equipped with enormous computation capability. A network connection is established between the thin client and the cloud server.

At the beginning of a game session and during game execution when model update is required, high quality and low quality 3D object models are generated at the cloud server. Two sets of low quality 3D object models are generated (with the sets being duplicate of each other) and one set of the low quality 3D object models is sent to the thin client. During the game execution, upon receiving the thin client's game controls input (indicated as "Client's actions" in FIG. 1), the cloud server executes the game logic which provides rendering inputs (indicated as "Rendering commands" in FIG. 1) in real time for the 3D object models to the graphic renderers, namely, the powerful graphic renderer of the cloud server and the thin graphic renderer of the thin client. In particular, rendering inputs that are relevant to low quality rendering pipeline are sent to the thin client. In this embodiment, the rendering inputs comprise camera positions and object motion parameters but in other embodiments, the rendering inputs may comprise other types of information.

Method 100 employs a layered coding technique. Details of this technique are elaborated below.

In particular, method 100 comprises rendering low quality graphics (base layer image or video stream) at the thin client using the rendering inputs provided to the thin graphic renderer of the thin client.

The method 100 further comprises rendering, with the powerful graphic renderer at the cloud server, both high quality graphics (high quality layer image or video stream) and a duplicate of the low quality graphics (base layer image or video stream). This is done using the rendering inputs provided to the powerful graphic renderer. The high quality layer has a higher quality than the base layer.

An enhancement layer image or video stream is then generated from the high quality layer and the duplicate of the base layer at the cloud server as follows. An image/video encoder at the cloud server compresses the high quality graphics using an inter-frame encoder with the cloud server's duplicate low quality graphics as a reference predictor frame. In other words, the correlation between the low and high quality graphics is used to compress the high quality graphics. Enhancement layer information is then generated from compressed prediction residue information between the high quality graphics and the duplicate low quality graphics at the image/video encoder of the cloud server, and is sent to the image/video decoder at the thin client. In this embodiment, standard H.264/AVC P-frame codec is used to generate the enhancement layer information but other types of codec may be used in other embodiments.

The image/video decoder at the thin client is in the form of an inter-frame decoder. This inter-frame decoder generates a composite layer image or video stream of high quality based on the low quality graphics (base layer) rendered at the thin client and the enhancement layer information received from the cloud server. In particular, the inter-frame decoder combines the base layer and the enhancement layer to form the composite layer. This is done by using the rendered low quality graphics as a predictor to decode the enhancement layer information into the composite layer display.

2. Design of Base Layer Rendering Pipeline

In computer graphics, various rendering techniques are deployed to render realistic visual effects. These visual effects introduce different amount of visual information to the graphics such as game images. Different rendering techniques incur different computation complexities.

A set of computationally-expensive rendering options which associated visual information can be easily compressed (and hence, be communicated efficiently through the enhancement layer) may be identified for the implementation of method 100. In particular, some example implementations of method 100 may involve removing such computationally-expensive rendering options at the base layer rendering pipeline, and producing their visual effects at the thin client by using the enhancement layer information rather than by rendering.

The following describes some rendering techniques and how their computations may be distributed in example implementations of method 100.

2.1 Polygonal Modeling

Polygonal modeling may be used to represent the surface and geometry of a 3D object in computer graphics. In polygonal modeling, three non-collinear vertices connect to each other via edges to form a triangle, which is the simplest polygon in Euclidean space to define a surface. When a sufficient number of vertices are connected via shared edges, a polygonal mesh can be formed to describe a complicated surface.

In addition to its simplicity in describing any complex 3D object, polygonal modeling is scalable to define different qualities (or to achieve different resolutions) of a geometric shape by varying the number of polygons used for a model of the shape. In particular, a finer description of a complex surface can be obtained by introducing a higher number of polygons to the model using methods such as subdivision surface [30]. Conversely, a coarse 3D object can be obtained by reducing the number of edges and polygons via methods such as progressive remeshing [20].

Various rendering processes are based on the surface of a polygon. The rendering complexity of computer graphics increases as the number of polygons to be included in the models increases. In other words, there is a trade-off between the quality and complexity of computer graphics rendering.

In one example implementation of method 100, the high quality and low quality 3D models generated at the cloud server are in the form of fine and coarse polygonal models respectively. A fine polygonal model comprises a higher number of polygons than a coarse polygonal model. Rendering the base layer at the thin client or the cloud server comprises using a coarse polygonal model (low polygon model) and rendering the high quality layer at the cloud server comprises using a fine polygonal model (high polygon model). The enhancement layer information comprises the visual information difference between the high polygon model and the low polygon model. In this example implementation, the number of polygons in the low polygon model is determined with the constraints that (1) the bitrate required to transmit the enhancement layer information from the cloud server to the thin client is minimized while (2) the rendering complexity of the base layer remains low enough to allow the rendering of the base layer to be performed with the limited computation capability of the thin client. The low polygon models are provided to the client infrequently (only when the models at the client are to be updated) during a session between the cloud server and the client. Rendering commands for the polygon models are transmitted in real time from the cloud server to the thin client to render the base layer.

Figure 2:
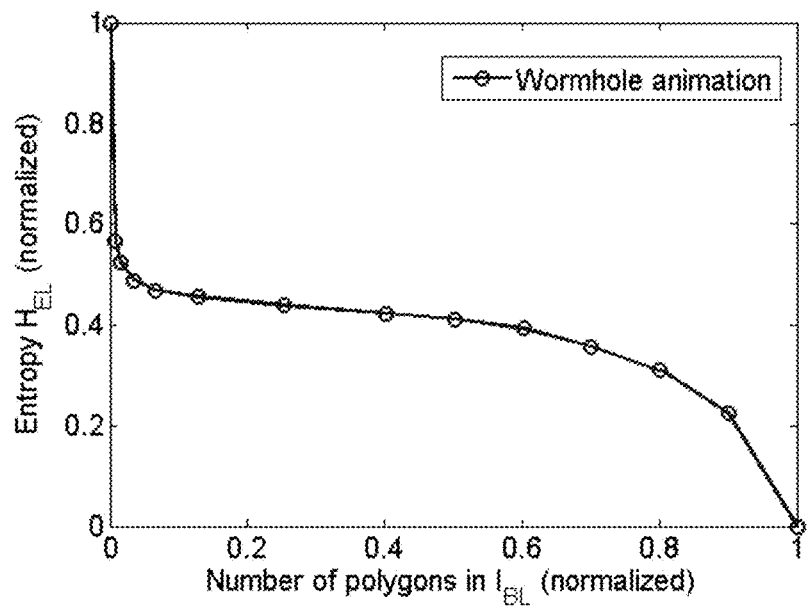
FIG. 2 shows a plot of normalized entropy of an enhancement layer against normalized numbers of polygons used for rendering a base layer in the method of FIG. 1.

FIG. 2 shows a plot of the normalized entropy $H_{EL}$ of the enhancement layer against the normalized number of polygons used for rendering the base layer $I_{BL}$. The normalized entropy values $H_{EL}$ shown in FIG. 2 are obtained after normalizing against the entropy of the high quality image $I_{HQ}$. The normalized numbers of polygons shown in FIG. 2 are obtained after normalizing against the number of polygons of the original high quality model. The test sequence used for generating the plot of FIG. 2 is the Wormhole animation. As shown in FIG. 2, the entropy $H_{EL}$ of the enhancement layer decreases as the number of polygons used for rendering the base layer $I_{BL}$ increases. This is because the higher the quality of the base layer rendered at the thin client, the lower the amount of information required in the enhancement layer to achieve the high quality composite layer.

2.2 Shading

Shading of a 3D object helps to improve the perception of the object by depicting depth with different levels of darkness on the object's surface. Popular shading techniques include flat shading, Gouraud shading and Phong shading [1, 21]. Flat shading is the simplest shading technique where each polygon is shaded according to the angle between the surface normal and the direction of the light source, and the colour and intensity of the light source. As pixels within a polygon are shaded similarly, with flat shading, edges between polygons are more pronounced in lower quality polygonal models than in higher quality polygonal models of smooth objects.

Figure 3:
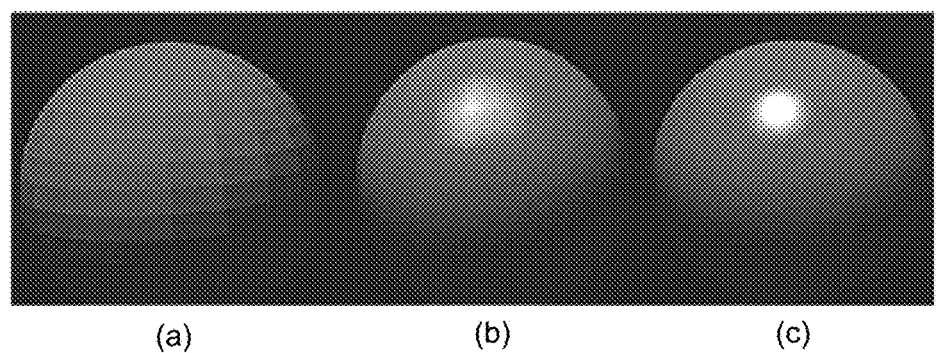
FIGS. 3(a)-(c) show shading effects when flat shading, Gouraud shading and Phong shading are used respectively.

Gouraud and Phong shading are smooth shading techniques which use interpolation techniques to compute pixels' values. In Gouraud shading, the lighting at the vertices of each polygon are computed and linearly interpolated within the polygon. With Gouraud shading, smooth shading effects can be achieved without substantial additional rendering complexity. In Phong shading, surface normals are interpolated and the pixel colours are computed based on the interpolated surface normals and a Phong reflection model [21]. As compared to Gouraud shading, photo-realistic effects of Phong shading come at the price of requiring a larger number of computations. Examples of shading effects are shown in FIGS. 3(a)-(c). In particular, FIGS. 3(a)-(c) show the shading effects when flat shading, Gouraud shading and Phong shading are used respectively.

In one example implementation of method 100, rendering the base layer comprises using a Gouraud shading algorithm and rendering the high quality layer comprises using a Phong shading algorithm. In other words, Gouraud shading is used in the rendering pipeline of the low polygon model whereas Phong shading is used for rendering the high polygon model. Gouraud is a good approximation of Phong shading and thus, in the example implementation of method 100, the enhancement layer information can comprise only the realistic visual effect of the Phong reflection model, which are the smoothly shaded visual differences between the model rendered using Gouraud shading and the model rendered using Phong shading. These differences can be easily compressed.

Flat shading may instead be used for rendering the base layer in another example implementation of method 100. However, although flat shading is computationally fast, it results in pronounced edges between polygons. To conceal these polygon edges, a relatively large number of bits are required to smoothen out the edges. These bits may be transmitted to the thin client as part of the enhancement layer information but this is more bit-expensive than transmitting the realistic visual effect of the Phong reflection model. Therefore, it is preferable to use Gouraud shading for rendering the base layer as this requires a lower information rate for transmitting the enhancement layer information.

2.3 Texture Mapping

While shading defines a surface of a 3D object with different levels of depth, the shaded surface is still plain without textures, details and colours. Texture mapping [12] is a rendering process that introduces textures and colours to the surface of a 3D model. To perform texture mapping, each vertex in a polygon is assigned a texture coordinate and interpolation is then performed across the surface of the polygon to produce a rich visual effect on the surface.

To achieve realistic effects in game graphics, textures of objects in the graphics are preferably as close as possible to textures of real world objects. Hence, texture mapping aims to introduce visual information that is close to that of natural images. Existing image/video codecs such as JPEG2000 [26] and H.264/AVC [33] are able to compress such information efficiently. It has been shown in [16] that high visual quality can be preserved when compressed texture details are overlayed on top of a low quality 3D model.

In an example implementation of method 100, rendering the base layer comprises rendering a base colour of an object's material and the enhancement layer provides the texture of the object. In other words, texture mapping is excluded from the rendering pipeline of the low polygon model, and the texture and pattern information are instead compressed and included in the enhancement layer information to be transmitted from the cloud server to the thin client. With this method, rendering of the base layer can be more easily performed and the size of the enhancement layer information can be reduced.

2.4 Displacement Mapping

Unlike texture mapping that renders patterns to the surface, normal/bump/displacement mapping renders bumpy and rough details on the surface of a 3D object without using more polygons. In particular, normal/bump mapping [22] achieves the rough surface effects by introducing a normal map. Manipulation of the normal map affects the shading of the surface, giving the illusion of a rough and bumpy surface on an otherwise smooth surface. In displacement mapping [31], positions of points are displaced along surface normals according to the value of the texture function at each point on the surface. The displacement leads to a perception of real depth, self-occlusion and self-shadowing of a rough surface.

As normal/bump mapping affects only the shading of the surface, visual information differences from rendering with and without normal/bump mapping can be included as the effects of surface shading.

Whereas, in displacement mapping, as each point on the surface is displaced according to the texture value, the overall visual effects of the displacement (self-occlusion and self-shadowing) are highly correlated with the texture's pattern.

In an example implementation of method 100, rendering the high quality layer comprises using normal or bump mapping and rendering the base layer comprises rendering without normal or bump mapping i.e. normal or bump mapping is excluded from the rendering pipeline of the low polygon model. In this example implementation, the enhancement layer comprises effects from rendering with the normal or bump mapping. Such effects may be compressed and/or transmitted together with the shading effects described in section 2.2 e.g. the smoothly shaded visual differences between the model rendered using Gouraud shading and the model rendered using Phong shading.

In another example implementation of method 100, rendering the high quality layer comprises using displacement mapping and rendering the base layer comprises rendering without displacement mapping i.e. displacement mapping is excluded from the rendering pipeline of the low polygon model. In this example implementation, the enhancement layer comprises effects from rendering with the displacement mapping. Since the visual effects of the displaced surface are correlated with texture, these visual effects can be efficiently compressed together with the texture information as the enhancement layer information. In other words, the effects from rendering with displacement mapping can be compressed and/or transmitted together with the texture information described in section 2.3. However, having a displaced surface can modify the object's silhouettes which implies that the enhancement layer information may also comprise high frequency edges. Such high frequency edges may be transmitted separately from the texture information. Depending on the extent of the displacement, such high frequency edges are unlikely to require a substantial number of bits for transmission.

2.5 Illumination

In game rendering, illumination simulates reflections of light sources and their subsequent inter-reflections in a 3D scene.

2.5.1 Phong Reflection

Figure 4:
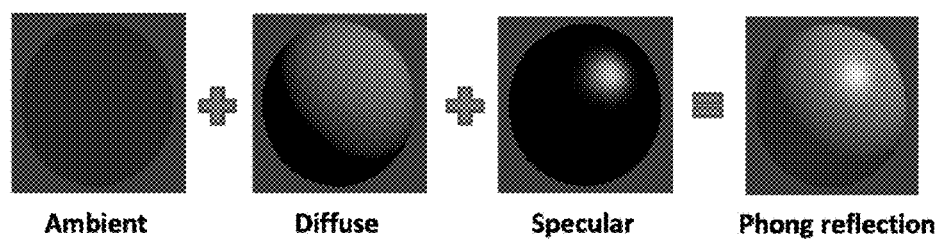
FIG. 4 shows a visual illustration of the Phong reflection model.

A light reflection model describes the local illumination of a point on a 3D surface from a direct light source. One such light reflection model is the Phong reflection model which is an empirical model that describes surface reflections of light rays as the combination of the following reflection components: (i) ambient reflection (which models a constant amount of light applied to every point in the scene), (ii) diffuse reflection off rough surfaces (which models reflected light that is scattered equally in all directions) and (iii) specular reflection off shiny surfaces (which models reflected light that concentrates along the direction of the perfectly reflected ray). A visual illustration of the Phong reflection model is shown in FIG. 4.

Under the Phong reflection model, the intensity value of a point or surface pixel ξ of a surface due to light sources reflected off it can be expressed as:

$$I(\xi) = k_a i_a + \sum_{l \in L} [k_d (L_l \cdot N) i_{d,l} + k_s (R_l \cdot V)^\alpha i_{s,l}] \quad (1)$$

where $k_a i_a$ represents the ambient reflection component, $k_d(L_l \cdot N)i_{d,l}$ represents the diffuse reflection component, $k_s(R_l \cdot V)^\alpha i_{s,l}$ represents the specular reflection component, and $I(\xi)$ represents the intensity of the reflected light sources off a point or surface pixel ξ of the surface. {a, d, s} are the subscripts representing the ambient, diffuse and specular components respectively; k is the reflection constant while i is the intensity of a light source for each reflection component; L is the set of all light sources while l is a light source instance. α>1 is the shininess constant of the surface material and has a larger value for smoother or more mirror-like surfaces. How $I(\xi)$ is computed depends on the type of shading used. In particular, a vertex shader computes $I(\xi)$ for each vertex while a pixel shader computes $I(\xi)$ for each pixel.

Figure 5:
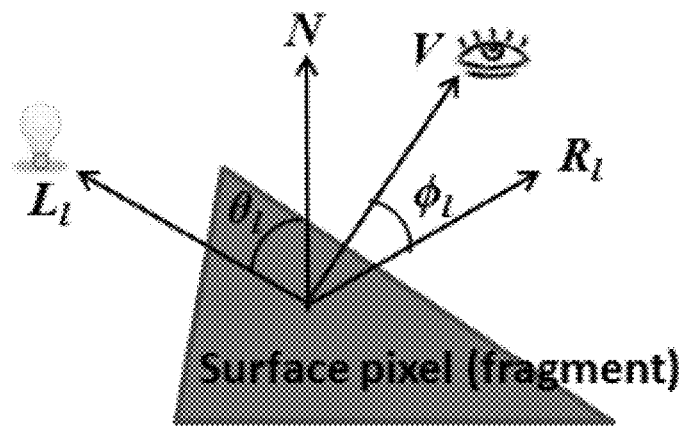
FIG. 5(a) shows vectors representing the Phong reflection model and FIG. 5(b) shows a plot of normalized entropy of the enhancement layer against normalized complexity of rendering the base layer.
Figure 5:
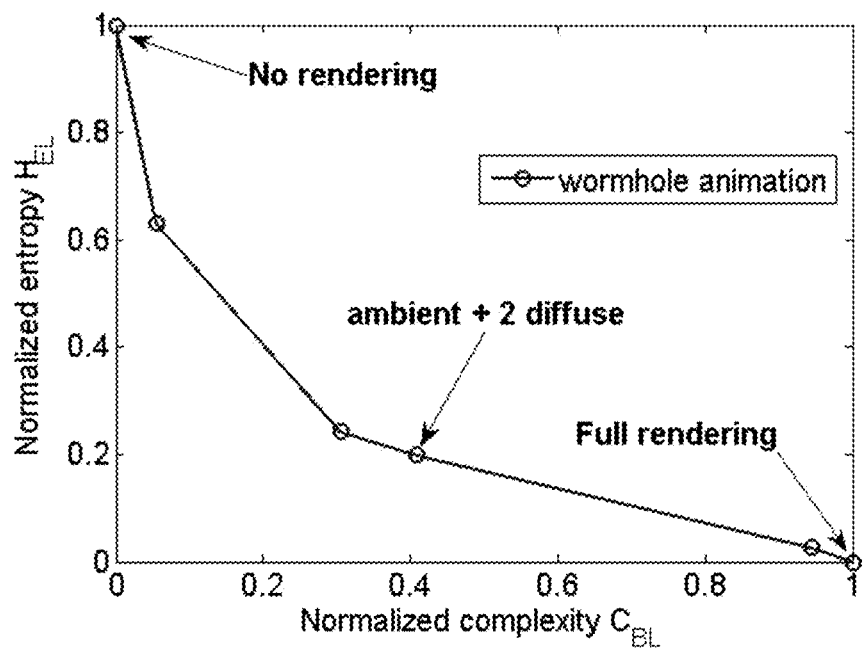

FIG. 5(a) shows the vectors representing the Phong reflection model. In FIG. 5(a), $L_l$ is the light source direction; N is the normal of the surface pixel $\xi$; $R_l$ is the reflection direction of the light source; V is the direction pointing towards the viewer. For a given light source l and a viewer position V, vectors N and $R_l$ vary at different surface pixels $\xi$.

From Equation (1), the computation complexity of different Phong reflection components can be estimated. For instance, the ambient reflection component involves a scalar multiplication, whereas the specular reflection component involves an inner product of vectors, a computationally-expensive exponent (specifically, raising to the α-th power), and two scalar multiplications. In total, Equation (1) requires 14 multiplications, 6 additions, a subtraction, and an exponent per light source for each surface pixel.

The rendering complexity of the Phong reflection components can be measured by the number of arithmetic operations per pixel in the Graphics Processing Unit (GPU). The complexity and energy consumption of different types of arithmetic operations in GPU has been studied in [36]. The rendering complexity of different Phong configurations with different reflection components and light sources can be computed by using Equation (1), with GPU energy consumption of the arithmetic operations calculated using the data in [36].

Each Phong reflection component introduces different information content to the final rendered image as can be seen from FIG. 4. Ambient reflection introduces uniform lighting and silhouette to the 3D object, diffuse reflection introduces smooth lighting, and specular reflection introduces isolated, sparse bright colours.

2.5.1.1 Scalable Nature of Phong Reflection

It is possible to utilize the scalable nature of the Phong reflection model for implementing method 100. In particular, the rendering complexity of the base layer can be reduced by using a Phong reflection model with a reduced number of reflection components. For example, the complexity of rendering the base layer can be reduced successively by omitting the reflection components from the Phong reflection model used to render the base layer in the order of first, the specular reflection component, followed by the diffuse reflection component and finally the ambient reflection component. A more fine-grain complexity scaling can further be achieved by reducing the number of light sources.

Table 1 shows the complexity levels when using various Phong reflection configurations (i.e. Phong reflection models with different reflection components) for rendering. For example, a Phong reflection configuration "ambient+2 diffuse+2 specular" uses a Phong reflection model with all the reflection components shown in Equation (1) and with all the light sources for both the diffuse reflection component and the specular reflection component (in the case shown in Table 1, the total number of light sources is two i.e. |L|=2). This may be referred to as the full Phong reflection configuration.

As shown in Table 1, there is a trade-off between the information content of the enhancement layer $I_{EL}$ and the rendering complexity of the base layer $I_{BL}$. If the base layer is rendered with the highest complexity with the full Phong configuration at the base layer, then the base layer is the same as the high quality layer $I_{BL}=I_{HQ}$ (with respect to the illumination). In this case, the entropy of the enhancement layer $H_{EL}=0$, i.e., no enhancement layer information needs to be transmitted to the thin client. At the other extreme, when the base layer is not rendered at all at the thin client, the entropy of the enhancement layer to be transmitted to the thin client is equal to the entropy of the high quality layer i.e. $H_{EL}=H_{HQ}$.

TABLE 1

| Complexity | Phong reflection configuration |
| --- | --- |
| Highest | ambient + 2 diffuse + 2 specular |
| | ambient + 2 diffuse + 1 specular |
| ↓ | ambient + 2 diffuse |
| | ambient + 1 diffuse |
| Lowest | ambient |
| No rendering | |

FIG. 5(b) shows a plot of the normalized entropy $H_{EL}$ of the enhancement layer $I_{EL}$ against the normalized complexity $C_{BL}$ of rendering the base layer. The normalized entropies of FIG. 5(b) are obtained by normalizing the entropies against the entropy $H_{HQ}$ of the high quality layer when rendering of the base layer is not performed (i.e. No rendering of base layer). The normalized complexities of FIG. 5(b) are obtained by normalizing the computation complexities of using different Phong reflection configurations against the computation complexity of using the full Phong reflection configuration for rendering the base layer. The test game sequence used to generate FIG. 5(b) is the Wormhole animation. As there are 2 light sources in this test game sequence, |L|=2 for the full Phong reflection configuration.

The Phong reflection configuration to be used for rendering the base layer can be determined by minimizing the complexity $C_{BL}$ of rendering the base layer and the entropy $H_{EL}$ of the enhancement layer, while satisfying the constraint that the rendering of the base layer can still be achieved with the limited computation capability of the thin client (since the base layer is to be rendered at the thin client). Depending on the computation resources of the thin client and the target compression ratio, the optimal Phong reflection configuration to be used for rendering the base layer can be determined by solving Equation (2).

$$\min H_{EL} + \lambda C_{BL} \qquad (2)$$

where λ is the Lagrangian variable which determines the trade-off between the transmission bit-rate of the enhancement layer information and the base layer computation complexity. The value of λ depends on the deployment scenario: a larger λ suggests that a lower $C_{BL}$ is desired at the expense of a higher $H_{EL}$, and a smaller λ suggests that a lower $H_{EL}$ is desired at the expense of a higher $C_{BL}$.

As shown in FIG. 5(b), removing the specular component alone (while still using two light sources for the diffuse component) is sufficient to reduce $C_{BL}$ to 40% of the complexity of using the full Phong reflection configuration. Further, in this case, $H_{EL}$ is still only 20% of the entropy $H_{HQ}$ of the high quality layer with no rendering of the base layer. This is because the specular reflection component comprises the computationally-expensive exponent (raised to the α-th power) but this component merely introduces sparse shiny details.

Therefore, in one example implementation of method 100, rendering the base layer comprises using a Phong reflection model with the ambient and diffuse components, and rendering the high quality layer comprises using a Phong reflection model with the ambient, diffuse and specular components. However, in other example implementations, rendering the base and high quality layers may comprise using other Phong reflection configurations.

2.5.1.2 Information Analysis of Phong Reflection

As all the vectors in Equation (1) are in unit length, it is possible to write:

$$L_l \cdot N = \cos\theta_l \geq 0, \quad (3)$$
$$R_l \cdot V = \cos\phi_l \geq 0,$$
$$\forall \theta_l,$$
$$\phi_l \in \left[-\frac{\pi}{2}, \frac{\pi}{2}\right]$$

since $\theta_l, \phi_l$ beyond $$\left[-\frac{\pi}{2}, \frac{\pi}{2}\right]$$

do not result in light reflection. Note that $\theta_l, \phi_l$ vary at different surface pixels $\xi$, while $i_{\{d,s\}}$ only varies for $\xi$ on different surfaces, due to different distances between the surfaces and the light sources.

Thus Equation (1) can be rewritten as:

$$I(\xi) = k_a i_a + \sum_{l \in L} [k_d \cdot \cos\theta_l(\xi) \cdot i_{d,l}(\xi) + k_s \cdot \cos^\alpha \phi_l(\xi) \cdot i_{s,l}(\xi)] \quad (4)$$

where $k_a i_a$ represents the ambient component, $k_d \cdot \cos\theta_l(\xi) \cdot i_{d,l}(\xi)$ represents the diffuse component and $k_s \cdot \cos^\alpha \phi_l(\xi) \cdot i_{s,l}(\xi)$ represents the specular component. $\theta_l, \phi_l, i_{d,l}, i_{s,l}$ are written as $\theta_l(\xi), \phi_l(\xi), i_{d,l}(\xi), i_{s,l}(\xi)$ so as to emphasize the spatial variance i.e. the variation of these across different pixels $\xi$.

Reflection of a light source is determined by two independent factors: the intensities $i_a, i_d, i_s$ and the angles $\theta_l, \phi_l$. The intensities $i_a, i_d, i_s$ depend on the attenuation of the light rays, while the angles $\theta_l, \phi_l$ depend on the positions of the light sources l which are projected onto the pixel $\xi$. Due to Equation (3), the positive intensities $i_a, i_d, i_s$ and positive constants $k_a, k_d, k_s$, all reflection components contribute non-negative values to the final value $I(\xi)$ of the pixel $\xi$.

The information content of an 8-bit depth rendered image I can be characterized by the Shannon entropy $$H = -\sum_{x=0}^{255} p_x \log_2(p_x),$$

where $p_x$ is the fraction of pixels in I whose intensity value is x. In the Phong lighting image, each reflection of a light source contributes a fraction of a non-negative value to the final rendered image. H of a rendered image contains the information generated from the diffuse and specular reflections, which comprise different pixel values with some distributions. Ambient reflection generates little information as it contributes only a DC value across the whole image. Thus, $$H \approx \sum_{l \in L} [H_d(l) + H_s(l)] \quad (5)$$

where $H_d(l)$ and $H_s(l)$ are the entropies of the diffuse and specular reflections respectively of a light source l.

To facilitate the optimization of the joint rendering-coding pipeline (i.e. to facilitate the decision on the optimal amount of computational complexity for rendering the base layer), the amount of information content generated by each reflection $H_d(l)$, $H_S(l)$ is estimated. Reflections with higher $H_d(l)$, $H_s(l)$ contribute more information content to the final rendered image, and therefore are more important.

Obtaining $H_d(l)$, $H_s(l)$ can be challenging. This is because although true values of $H_d(l)$ and $H_s(l)$ can be obtained by rendering their respective reflections using Equation (4) for all surface pixels, and then computing their Shannon entropy, this approach is computationally expensive.

Rather than performing the rendering, $H_d(l)$, $H_s(l)$ may instead be estimated from the statistics associated with the diffuse/specular reflections in Equation (4). The statistics include the number of non-zero values, mean, variance etc. To begin, the distributions of the diffuse/specular reflections are first characterized as the entropy depends on the statistical distribution. Then, the entropy is derived separately for the diffuse/specular reflections. This is elaborated below.

2.5.1.2.1 Specular Reflection

Specular reflections characterize the sparse and isolated reflections on a shiny surface. The specular reflection component in Equation (4) comprises a cosine function raised to the power of $\alpha$. The intensity $I(\xi)$ is the strongest around the "center" surface pixel $\xi$ at which $R_l$ aligns with V ($\cos \phi_l = 1$) and the power term suggests a rapid exponential decay of intensity $I(\xi)$ around this "center" surface pixel $\xi$. This implies that the number of pixels in the zero reflection areas $\{\xi: \cos \phi_l(\xi)=0\}$ is unproportionately larger than that with non-zero reflections: $\{\xi: \cos \phi_l > 0\}$.

Figure 6:
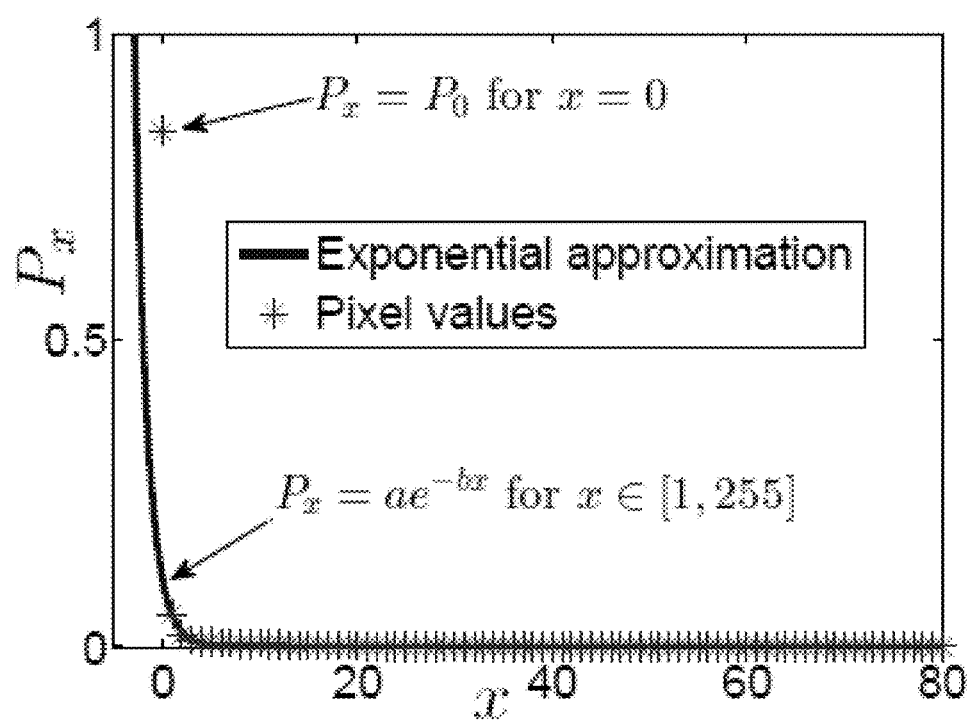
FIG. 6 shows a histogram of pixel intensities due to specular reflection.

Let the intensity value of a specular reflection of a light source l on a surface pixel $\xi$ be $x = k_s \cdot (\cos \phi_l)^\alpha \cdot i_{s,l}$, $x \in [0, 255]$, where $i_s(\xi)$ are the same for all $\xi$. FIG. 6 shows a typical histogram of pixel intensities due to the specular reflection. The probability distribution function (PDF) of the specular reflection on the 3D surface can therefore be approximated with an exponential distribution as follows:

$$P_x = \begin{cases} P_0 & x = 0 \\ ae^{-bx} & x \in [1,255]; 0 < a << P_0 < 1; b > 0 \end{cases} \quad (6)$$

where $\{a, b\}$ are the PDF parameters. $P_0$ is defined separately from the exponential PDF as pixels with the specular reflection intensity value being zero (i.e. zero pixels) outnumber pixels with the specular reflection intensity value being non-zero (i.e. non-zero pixels). The exponential decay of pixel values demonstrates the sparse and isolated reflection of a shiny surface.

Let $\bar{p}$ be the fraction of non-zero pixels:

$$\bar{p} = \sum_{x=1}^{255} P_x = 1 - P_0 \quad (7)$$

Using the Maclaurin series in Equation (8) for natural logarithm, $$\ln(1-y) = -\sum_{n=1}^{\infty} \frac{y^n}{n} \forall |y| < 1 \quad (8)$$

($P_0=1-\bar{p}, y=\bar{p}$) for expansion, and Equations (5)-(6), the Shannon entropy of a specular reflection can be expressed as:

$$H_s = -P_0 \log_2(P_0) - \sum_{x=1}^{255} P_x \log_2(P_x) \quad (9)$$

$$= \frac{1-\bar{p}}{\ln 2} \sum_{n=1}^{\infty} \left(\frac{\bar{p}^n}{n}\right) - \sum_{x=1}^{255} (ae^{-bx}) \log_2(ae^{-bx}) \quad (10)$$

Let $\bar{p}^n \approx 0 \forall n>1$, the first term of Equation (10) can be approximated as $$H_s \approx \frac{\bar{p}}{\ln 2} - \log_2(a) \sum_{x=1}^{255} ae^{-bx} + \sum_{x=1}^{255} (ae^{-bx})(b \ln 2 x) \quad (11)$$

$$= \frac{\bar{p}}{\ln 2} - \log_2(a)\bar{p} + E[b \ln 2 x] \quad (12)$$

$$= \left(\frac{1-\ln a}{\ln 2}\right) \cdot \bar{p} + b \ln 2 \cdot E[X] \quad (13)$$

$$= h_{s,1} \cdot \bar{p} + h_{s,0} \cdot E[X] \quad (14)$$

where $h_{s,i}$, $i=\{0,1\}$ are some positive constants and $E[X]$ is the pixels' mean. As zero-value pixels outnumber non-zero-value pixels, $\bar{p} \ll P_0 \Rightarrow E[X] \approx 0$. Besides, it can be found in experiments that $k_{s,0} \ll h_{s,1}$. The second term associated with the pixels' mean can therefore be neglected without significantly compromising the accuracy.

The above implies that the Shannon entropy of specular reflection is approximately linear to the number of non-zero (i.e. illuminated) pixels i.e. $H_s \approx h_{s,1} \bar{p}$.

2.5.1.2.2 Diffuse Reflection

Unlike specular reflections, diffuse reflections cause a smooth and gradual spread of lighting on a 3D surface. Non-zero pixels constitute a bigger fraction and spread across a wider range of pixel values in their PDF. Unlike specular reflection, the cosine function in the diffuse reflection is not raised to a higher power, thus there is a slower decay in brightness across a larger surface.

Figure 7:
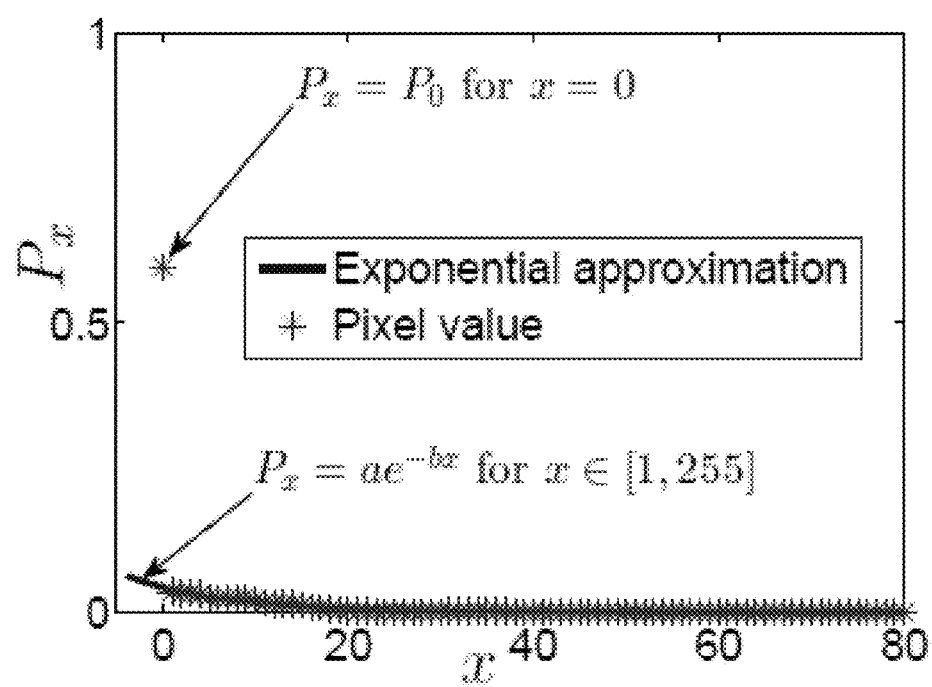
FIG. 7 shows a histogram of pixel intensities due to diffuse reflection.

Let the intensity value of a diffuse reflection of a light source/on a surface pixel be $x = k_d \cos \theta_l \cdot i_{d,l}$, $x \in [0,255]$. In general, the PDFs of the diffuse reflection depend on the surface geometry and are therefore less coherent in shape. However, the number of surface pixels not illuminated by a lighting source remain high, as the surrounding pixels of bright areas: $\{\xi: \cos \theta_l(\xi) > 0\}$ always shade to dark: $\{\xi: \cos \theta_l(\xi) = 0\}$. Therefore, Equation (6) is applicable to diffuse reflections too, but at a slower decay of the exponential distribution and with a lower $P_0$, as shown in FIG. 7 (which shows the PDF of the intensity values for diffuse reflection). This implies that $$0 < a < P_0 < 1, \quad b \text{ is greater than but close to } 0 \quad (15)$$

The equation for the derivation of the information content of a diffuse reflection is similar to Equations (9)-(10). However, the second-order of $\bar{p}$ in the expansion of the Maclaurin series can no longer be neglected due to the possible higher values of $\bar{p}$. Similar to the derivation from Equation (10) to Equation (12) and with $\bar{p}^n \approx 0 \forall n>2$, the Shannon entropy of a diffuse reflection can be expressed as:

$$H_d \approx \frac{\bar{p}}{\ln 2} - \frac{\bar{p}^2}{2\ln 2} - \log_2(a)\bar{p} + E[b \ln 2 X] \quad (16)$$

$$= -\left(\frac{1}{2\ln 2}\right) \cdot \bar{p}^2 + \left(\frac{1-\ln a}{\ln 2}\right) \cdot \bar{p} + (b \ln 2) \cdot E[X] \quad (17)$$

$$= -h_{d,2} \cdot \bar{p}^2 + h_{d,1} \cdot \bar{p} + h_{d,0} \cdot E[X] \quad (18)$$

Where $h_{d,i}$, $i=\{0,1,2\}$ are some positive constants. Note that from Equation (15), b is >0 but close to 0 implies that $h_{d,0} \approx 0$. When a diffuse reflection is weak, $\bar{p} \ll P_0 \Rightarrow E[X] \approx 0 \Rightarrow h_{d,0} \cdot E[X] \approx 0$ and $\bar{p}^2 \approx 0$.

The above implies that the Shannon entropy of the weak diffuse reflection is approximately linear to the number of non-zero pixels: $H_d \approx h_{d,1} \bar{p}$.

2.5.1.2.3 Experiments

Figure 8:
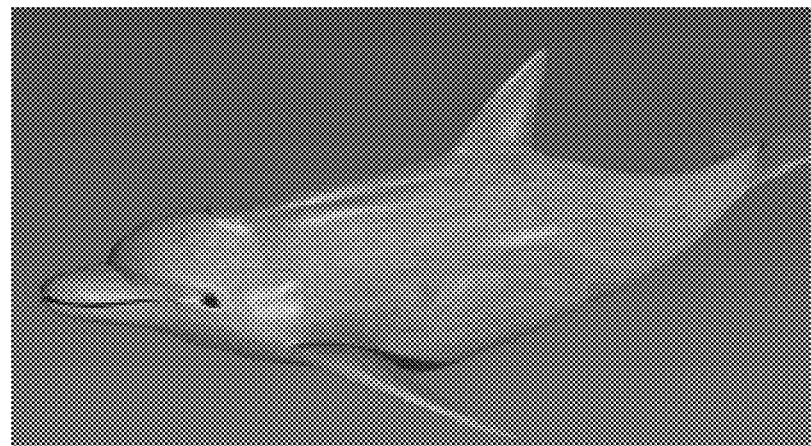
FIGS. 8(a)-(b) show image samples of a Dolphin model and a Spaceship model respectively.
Figure 8:

Experiments are performed using Blender [7], a popular graphic rendering software for 3D animations to render the photo-realistic images of two 3D models: Dolphin and Spaceship, which are free sample models in the Blender community. Image samples of the Dolphin and Spaceship models are shown in FIGS. 8(a)-(b) respectively. As shown in FIGS. 8(a)-(b), the Dolphin model comprises a more organic surface whereas the Spaceship model comprises a more geometric surface.

Figure 9:
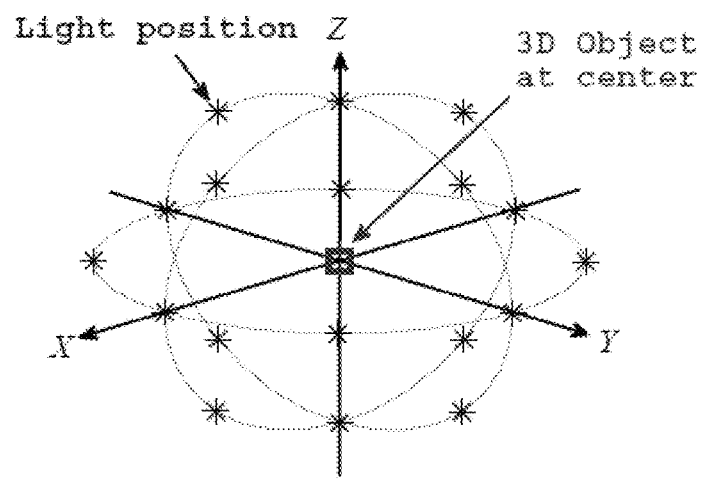
FIG. 9 shows light sources with different angles of illumination at equal distances from an object.
Figure 10:
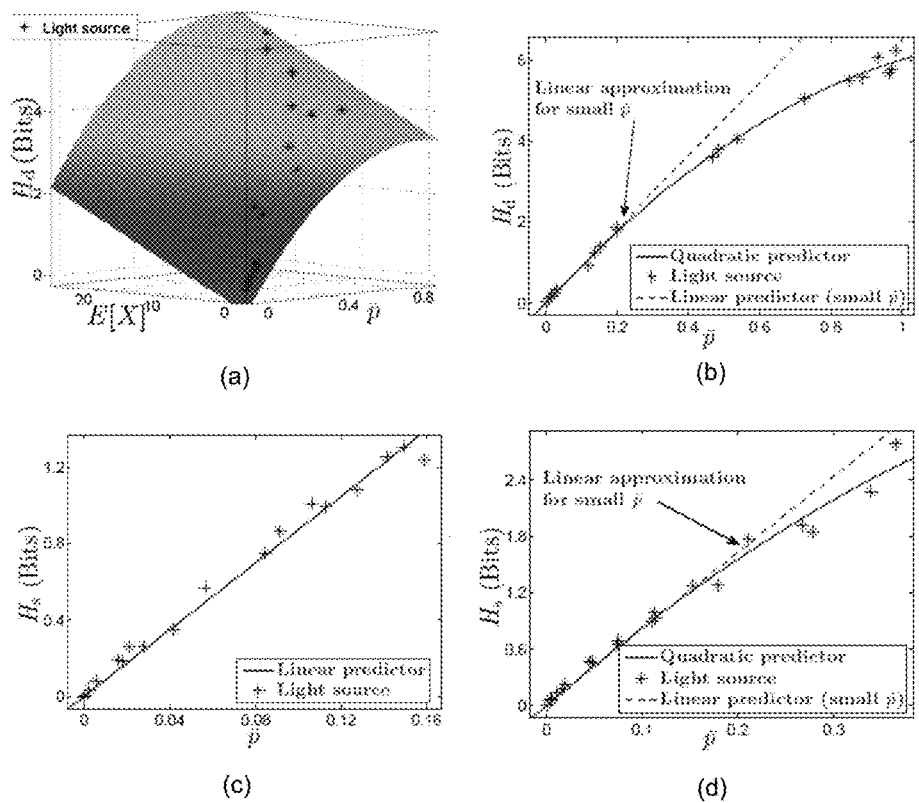
FIGS. 10(a)-(d) show linear predictors of image entropy for diffuse reflection and specular reflection for the models of FIGS. 8(a)-(b)

In the experiments, images of the objects in the models illuminated by light sources from various angles are rendered as shown in FIG. 9. In particular, FIG. 9 shows the light sources with the different angles of illumination and at equal distances (hence, intensities) from a 3D object. From the rendered images, the images' histograms are constructed and the entropy of only the 3D objects (i.e. disregarding the background pixels) is computed. FIGS. 10 (a)-(d) show the linear predictors of image entropy for the two graphic samples. In particular, FIGS. 10(a)-(b) show the predictors for diffuse reflection for the Spaceship and Dolphin models respectively, whereas FIGS. 10(c)-(d) show the predictors for specular reflection for the Spaceship and Dolphin models respectively.

As shown in FIGS. 10 (c)-(d), there are strong linear relationships between $\bar{p}$ and $H_s$. $\bar{p}$ of the specular reflections are confined within 0.16 for the Dolphin model, whereas for the Spaceship model, due to its geometric surface, the surface normals over a wide surface are almost uniform. Thus, when a light source illuminates from the appropriate angle, it results in $\cos \phi \approx 1$ over a large surface. Consequently, $\bar{p}$ is higher. Nevertheless, a second-order term (as in Equation (18)) can correct the discrepancy of linear prediction for values of $\bar{p}$ greater than but close to 0.25.

For diffuse reflections, FIG. 10(b) shows accurate quadratic predictions of $H_d$ using $\bar{p}$, while FIG. 10(a) further includes $E[X]$. Note that $0 \leq \bar{p} < 1$ for diffuse reflections. Similar to the specular reflections, a linear predictor is accurate at values of $\bar{p}$ greater than but close to zero. Predictions beyond values of $\bar{p}$ near zero require $\bar{p}^2$ and possibly $E[X]$.

Table 2 shows the goodness of fits of various predictors for $H_d$. In evaluating a parametric model, adjusted $R^2$ measures how successful a model explains the variation of data, while adjusting for the number of explanatory terms in the model relative to the number of data points. RMSE is the root-mean-square of errors. Adjusted $R^2$ closer to 1 and lower RMSE represent better fits of a model, and vice versa. For the Dolphin model, quadratic $\bar{p}$ improves the accuracy substantially, while adding $E[X]$ only improves the accuracy marginally. Thus, FIG. 10(b) shows a sufficiently accurate quadratic predictor. For the Spaceship model, having the quadratic $\bar{p}$ alone or adding the E[X] alone only improves the accuracy marginally as compared to just having a linear $\bar{p}$. However, a combination of quadratic $\bar{p}$ and E[X] as in Equation (18) describes the data very well, as shown in FIG. 10(a).

The above analytic models can help characterize the generation of information content of a rendered image under Phong lighting computation and can estimate the amount of information generated without actually performing the rendering. This makes possible a priori decision on the subset of illumination rendering to be performed for the base layer at the thin client and those to be performed for the high quality layer at the cloud server.

In particular, it can be seen from the above that the distribution of a light reflection in Phong lighting can be described by an exponential distribution. Based on an approximated distribution, the analytic models of the entropy for diffuse and specular reflections are derived, showing that the entropy of a rendered image can be expressed as a polynomial function of the number of non-zero pixels and the pixels' mean illuminated by a light source. For illuminations of weak intensity, the image entropy of the illuminations may be predicted by counting the number of non-zero pixels. Thus, the amount of information content a light source will contribute to the final rendered image can be predicted. Phong lighting can thus be optimized such that the light reflections that generate little information can be rendered in the cloud server.

In particular, in one example implementation of method 100, rendering the base layer comprises using a Phong reflection model with a first set of light sources and rendering the high quality layer comprises using a Phong reflection model with a second set of light sources, wherein as compared to the first set of light sources, the second set of light sources contributes less information content to the composite layer (the composite layer forms the final rendered image or video stream displayed to the client).

In the above example implementation, the amount of information content contributed by each light source to the composite layer is predicted based on intensity values of pixels in the composite layer to be generated. These intensity values may be determined using Equation (4) above. In particular, the information content is predicted based on a number of pixels with non-zero intensity values and a mean of the pixels' intensity values. For light sources with weak intensities, the information content may be predicted based alone on the number of pixels with non-zero intensity values.

The above is generally useful in applications requiring a method of determining entropy of an image to be rendered. This method may be based on intensity values of pixels in the image to be rendered using Equation (4) with the knowledge of the light sources. In particular, the method may comprise determining a number of pixels with non-zero intensity values in the image and a mean of the pixels' intensity values. For light sources with weak intensities, the information content may be predicted based alone on the number of pixels with non-zero intensity values. The method may be used not only for implementing method 100 but also for other applications of remote-assisted rendering, such as virtual/augmented reality.

2.6 Summary of Different Rendering Pipeline Configurations

Table 2 summarizes the different rendering pipeline configurations for high and low quality rendering described above.

In one example implementation of method 100, all the rendering pipeline configurations shown in Table 2 are used. Specifically, in this example implementation, method 100 comprises rendering the high quality layer with (i) a higher number of polygons, (ii) Phong shading, (iii) a Phong reflection model with all the reflection components and a higher number of light sources (including the light sources contributing less information content to the composite layer), (iv) global illumination, (v) texture mapping and (vi) displacement mapping, and rendering the base layer with (i) a lower number of polygons, (ii) Gouraud shading, (iii) a Phong reflection model without specular reflection components and a lower number of light sources (including the light sources contributing more information content to the composite layer).

However, other example implementations of method 100 may merely use some, and not all, of the rendering pipeline configurations shown in Table 2. In other words, the enhancement layer information may provide one or more of enhanced lighting, texture, shading and displacement mapping.

TABLE 2

| | Rendering pipeline configuration | |
|---|---|---|
| Rendering pipeline | Rendering of the high quality layer in the client server | Rendering of the base layer in the thin client or client server |
| Number of polygons used | Higher | Lower |
| Type of shading | Phong | Gouraud |
| Phong reflection model | All reflection components | Without specular reflection components |
| Phong reflection model | A higher number of light sources | A lower number of light sources |
| Phong reflection model | Light sources contributing less information content to the composite layer | Light sources contributing more information content to the composite layer |
| Global illumination | Included | Excluded |
| Texture mapping | Included | Excluded |
| Displacement mapping | Included | Excluded |

2.7 Study

A study is conducted using four game-like animations, namely Dolphin, Elfe, Lostride, Wormhole. These animations are free samples in the community of Blender [2], an open source graphic renderer. The number of polygons used for rendering the high quality layer for each of these animations is shown in Table 3.

TABLE 3

| Animation | Dolphin | Elfe | Lostride | Wormhole |
|---|---|---|---|---|
| Number of polygons used for rendering the high quality layer | 75780 | 113986 | 461552 | 129200 |

Figure 11:
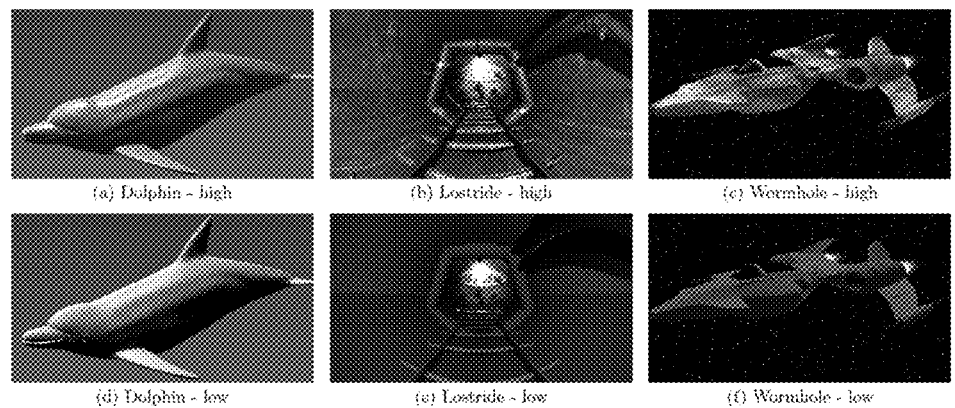
FIGS. 11(a)-(f) show results of rendering the high quality layer and the base layer of the Dolphin, Lostride and Wormhole animations.
Figure 12:
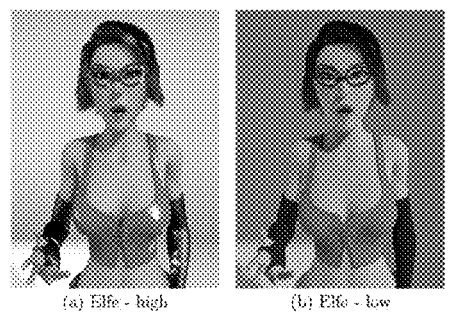
FIGS. 12(a)-(b) show results of rendering the high quality layer and the base layer of the Elfe animation.

Results of using all of the rendering pipeline configurations in Table 2 for rendering the high quality layers and the base layers of the animations are shown in FIGS. 11 and 12. In particular, FIGS. 11(a) and (d) respectively show the results of rendering the high quality layer and the base layer of the Dolphin animation, FIGS. 11(b) and (e) respectively show the results of rendering the high quality layer and the base layer of the Lostride animation, FIGS. 11(c) and (f) respectively show the results of rendering the high quality layer and the base layer of the Wormhole animation, and FIGS. 12(a) and (b) respectively show the results of rendering the high quality layer and the base layer of the Elfe animation.

3. Analysis of Low Polygon Models

In this section, the amount of information content of the enhancement layer with respect to the number of polygons used in the base layer rendering pipeline is analyzed. The complexities of various rendering processes scale with the number of polygons used in the base layer. Using more polygons can define a complex surface in finer detail.

In an example implementation of method 100, the enhancement layer information comprises the information difference (residual) between the rendering of the high polygon model at the cloud server and the rendering of the low polygon model at the thin client.

The following describes an investigation of the distribution and information content of the residual between the high and low polygon models (i.e. enhancement layer information). In particular, the number of polygons used in object models for the base layer rendering pipeline is reduced while the other rendering parameters are kept constant. Examples of distributions of residuals are shown by the solid lines in FIGS. 13(a)-(c). In the following subsections, the distribution of the residuals is first modeled and the model is used to illustrate the residuals' (enhancement layer information's) characteristics.

3.1 Mixture Model for Enhancement Layer

In a 3D model with a sufficiently high number of polygons, a small fraction of reduction in the number of polygons usually does not substantially deform the surface and geometry of the 3D model. This is because subsequent rendering processes can render an image close to that rendered using a higher number of polygons. Due to the complexity of simulating the rendering process, it is difficult to derive an analytical expression of how the residual varies with respect to the reduction in the number of polygons. However, it can be shown that the residual can be described with a thin Laplacian-like distribution. As the number of polygons is gradually reduced, the Laplacian-like distribution grows wider.

Figure 13:
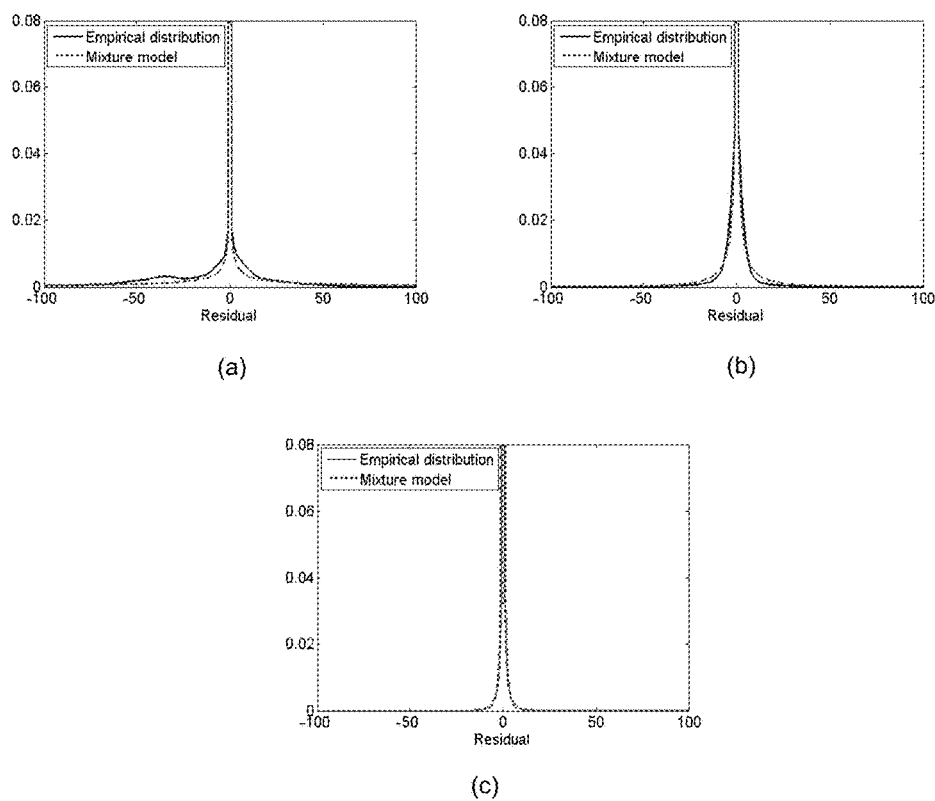
FIGS. 13(a)-(c) show examples of distributions of residuals between the high quality layer and base layer, and the fitting of a mixture model to these distributions.

When the number of polygons is reduced to the point where the surface geometry of the 3D model becomes severely deformed, information differences between the high and low polygon models increase substantially and the distribution of the residual departs from the Laplacian shape. This is shown in FIGS. 13(a)-(c) (which shows the distribution of the residuals when the Elfe animation is rendered with respectively 0.23, 0.60, 0.92 of a particular number of polygons). In particular, the distribution of the residual shown in FIG. 13(c) resembles the Laplacian-like distribution more closely than those in FIGS. 13(a) and (b). This is probably because the residuals no longer carry the incremental enhancement information, but the image's visual information itself.

Figure 14:
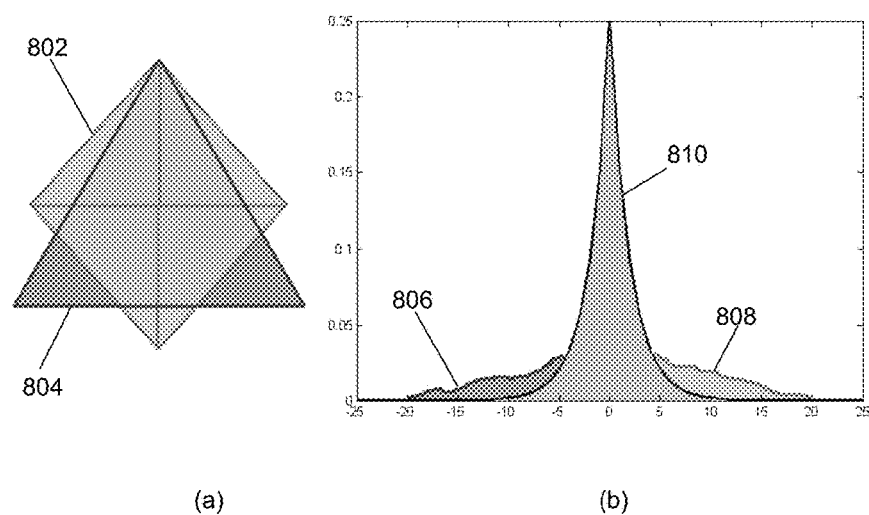
FIG. 14(a) shows a high polygon model and a low polygon model.
FIG. 14(b) shows the image histograms of the high and low polygon models of FIG. 14(a)

FIG. 14(a) shows a high polygon model 802 of an object and a low polygon model 804 of the same object. As shown in FIG. 14(a), the high polygon model 802 comprises 4 triangles and the low polygon model 804 comprises only a single triangle. As the residual is the difference between the high and low polygon models 802, 804, the Laplacian-like distribution arises from the subtraction of the overlapping part between the high and low polygon models 802, 804, while the non-overlapping parts significantly contribute to the departure of residual's distribution from the Laplacian shape. The non-overlapping parts represent the image information difference between the high and low polygon models. The high and low polygon models are represented by their respective image histograms 806, 808 in FIG. 14(b). The distribution 810 of the overlapping parts is also shown in FIG. 14(b).

The distribution of the residual can be modelled as a convex mixture of a zero-mean generalized Gaussian (ZMGG) distribution, and the image histograms of the low and high polygon models as shown in Equation (19).

$$f_{mix}(x) = w \cdot f_{ZMGG}(x) + (1-w) \cdot H_{LH}(x) \quad (19)$$

where x represents the residual's value, w represents the weight ($0 \leq w \leq 1$) and $H_{LH}(x)$ represents the image histograms of the low and high polygon models. Note that $H_{LH}(x)$ is arbitrary (it depends on the image content) but can be obtained from the rendering process.

$f_{ZMGG}(x)$ represents the ZMGG distribution and can be expressed as:

$$f_{ZMGG}(x) = \frac{a \cdot m}{2\sigma \Gamma\left(\frac{1}{m}\right)} \exp\left\{-\left(\frac{|x|}{\sigma}\right)^m\right\} \quad (20)$$

where $\Gamma(\bullet)$ is the Gamma function, $(a, m, \sigma)$ are the coefficients of the ZMGG distribution. Note that the Laplacian and Gaussian distributions are special cases of the ZMGG distribution in particular, they are ZMGG distributions with m=1 and m=2 respectively.

3.2 Fitting of the Mixture Model

To fit the mixture model to the residual's distribution, the nonlinear least square fitting method may be used to determine the optimal coefficients of the ZMGG distribution, expressed as follows:

$$(a^*, m^*, \sigma^*) = \arg\min_{a,m,\sigma} \sum_x \|f_{emp}(x) - f_{mix}(x)\|^2 \quad (21)$$

where $f_{emp}(x)$ represents the empirical distribution of the residual and $f_{mix}(x)$ is the mixture model in Equation (19).

The expectation maximization (EM) method [18] is applied to determine the weight w for $f_{mix}(x)$. The EM method seeks to maximize the mixture of probability distribution functions over observed samples. The problem to determine w can be expressed as $$w^* = \arg\max_w f_{mix}(x) \quad (22)$$

After some derivation, w can be solved using the following EM steps iteratively:

$E$-Step $\quad (23)$ $$p^{(i)}(x) = \frac{w^{(i)} f_{ZMGG}(x)}{w^{(i)} f_{ZMGG}(x) + (1 - w^{(i)}) H_{LH}(x)}$$

$M$-Step $\quad (24)$ $$w^{(i+1)} = \sum_x p^{(i)}(x) f_{emp}(x)$$

3.3 Effects of Reducing the Number of Polygons

Figure 15:
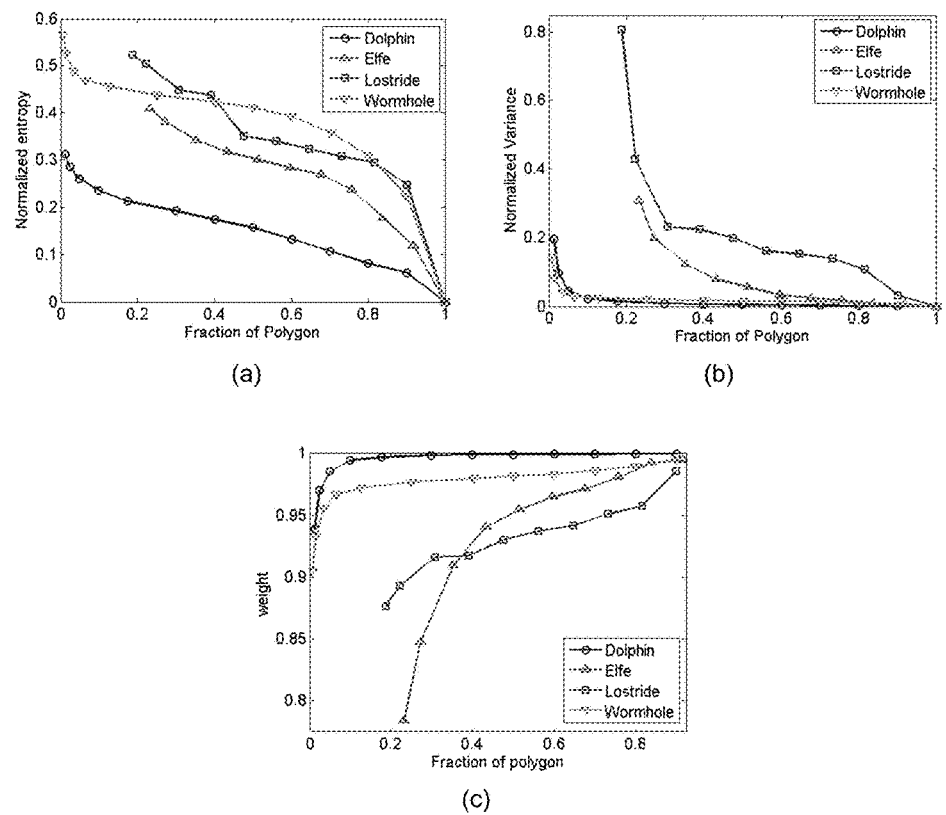
FIGS. 15(a)-(b) respectively show normalized entropies and normalized variances of the enhancement layer when rendering the Dolphin, Elfe, Lostride and Wormhole animations.
FIG. 15(c) shows weights of a mixed model at different fractions of reduction in polygon numbers at low quality rendering.
Figure 16:
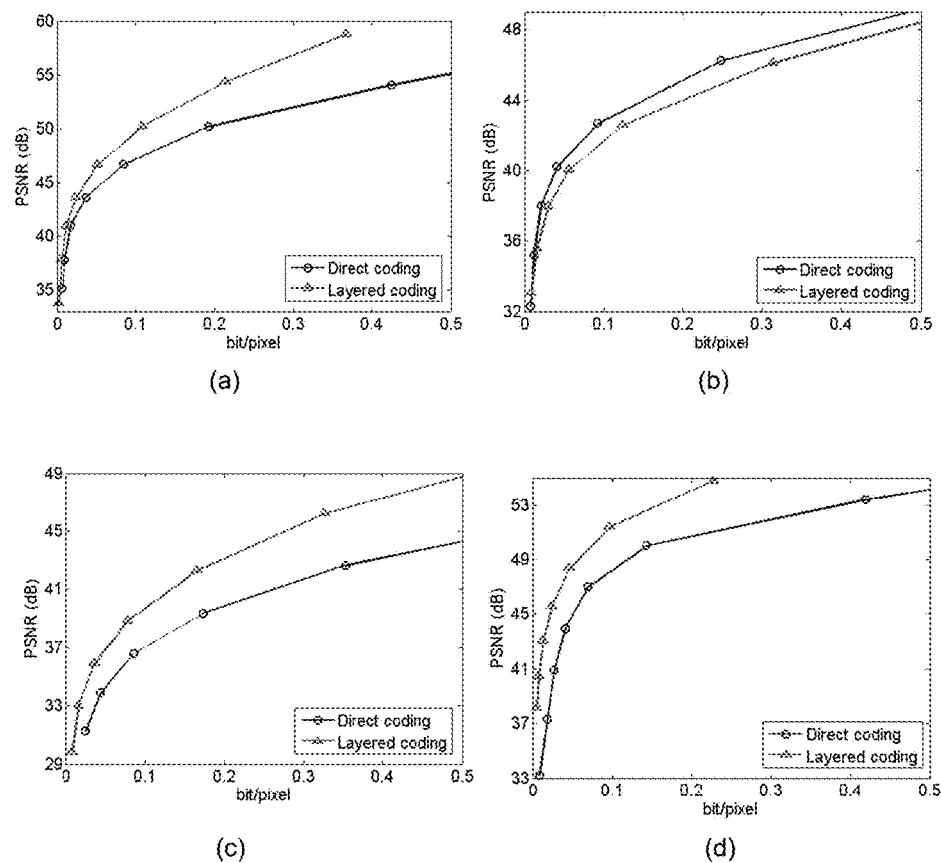
FIGS. 16(a)-(d) show rate-distortion curves when layered coding and direct coding are used for rendering the Dolphin, Elfe, Lostride and Wormhole animations.

FIG. 15(a) shows normalized entropies of the residuals with respect to the fraction of polygon (i.e. the fraction of reduction in the number of polygons from the high polygon model to the low polygon model) when rendering a number of animations (Dolphin, Elfe, Lostride, Wormhole). The entropies shown in FIG. 15(a) are normalized against the image entropy of the high quality layer when the number of polygons used for the base layer is zero (i.e. no rendering of the base layer is done), since in this case, the enhancement layer comprises the complete visual information of the high quality rendering. A high entropy of the residual implies that there is a high level of information difference between the high and low polygon models. In general, the amount of residual's information increases as the number of polygons for rendering the low polygon model is reduced and the trend of this increase is similar for all the animations.

FIG. 15(b) shows normalized variances of the residuals at different fractions of polygon. The Dolphin and Wormhole animations comprise simpler geometric structures and the number of polygons used for their full rendering is more than sufficient to fully describe their geometric structures. Thus, the 3D models for these animations are more robust to the reduction in polygon numbers as compared to those for the Lostride and Elfe animations. In particular, the number of polygons can be reduced up to 90% from the number of polygons used for the full rendering without resulting in a significant increase in the residuals' variances. However, as the number of polygons is reduced to less than 10% of the number of polygons used for the full rendering, a more significant distortion of the geometric shapes begins. At this point, there is also an exponential increase of the variance and entropy of the residuals. The 3D objects in Elfe (shirt, spectacles etc) and Lostride (tunnel, bars etc) animations are constructed by polygons just enough to define their geometric shapes during full rendering of these objects. Thus, these 3D objects are more vulnerable to geometric distortion due to the reduction in the number of polygons. Unlike Dolphin and Wormhole animations where the number of polygons can be reduced to less than 5% of the number of polygons used for the full rendering, the number of polygons cannot be reduced to below 20% for Elfe and Lostride without completely distorting the objects' geometries in these animations. In one example implementation of method 100, rendering the base layer comprises using between 5-20% of the number of polygons used for rendering the high quality layer.

FIG. 15(c) shows the weights w of the mixed model at different fractions of polygon calculated using the EM method (by performing steps (23) and (24) iteratively to obtain the converged weights). The converged weights are consistent with the variances of residuals shown in FIG. 15(b). As Dolphin and Wormhole animations are less sensitive to the reduction in the number of polygons, their residuals' distributions are dominated by the Laplacian-like ZMGG distribution, which suggests highly compressible content in the residuals. Conversely, as Elfe and Lostride animations are more susceptible to geometric distortion due to the reduction in the number of polygons, the image histograms of the low and high polygon renderings make up a bigger part in the distributions of their residuals. Compared to the Laplacian-like distribution source, the image contents of the low and high polygon renderings are more bit-expensive. The approximated mixtures of the distributions of the low and high polygon renderings $f_{mix}(x)$ are shown as the dotted lines in FIGS. 13(a)-(c).

Based on the above-described model of the growth of information content and variances of residuals with respect to the reduction in the number of polygons at low quality rendering, it can be seen that depending on the object's geometry and the number of polygons used, the complexity of the low quality rendering can be decreased without a substantial increase in the rate required to transmit the enhancement layer information. For example, rendering the low quality model at 10% of the number of polygons used for the full rendering reduces the rendering complexity substantially while the bitrate required for transmitting the enhancement layer information remains low. Therefore, in one example implementation of method 100, rendering the base layer comprises using approximately 10% of the number of polygons used for rendering the high quality layer.

4. Layered Coding of Enhancement Information

An example implementation of method 100 is presented below. In this example, Blender [2], a popular graphic rendering software for game content creation, is used to render the animations Dolphin, Elfe, Lostride, and Wormhole described above. The rendered resolution is 1280×720 for all animations (except Elfe where the rendered resolution is 768×1024), and at 30 frames per second for all animations. The enhancement layer information is the visual difference between the high and low quality renderings and the method 100 uses all of the rendering pipeline configurations shown in Table 2. The fraction of the number of polygons used for rendering the low quality models (base layer) with respect to the number of polygons used for rendering the high quality models (high quality layer) are 0.125, 0.41, 0.20, and 0.115 for the Dolphin, Elfe, Lostride and Wormhole animations respectively. These fractions are determined by obtaining the lowest possible fractions before severe geometric distortion begins to take effect.

JM, which is the reference model for the current widely deployed codec AVC/H.264, is used for coding the enhancement layer information. Rather than performing temporal prediction to reduce the temporal redundancy, layered coding reduces the redundancy between high and low quality rendered images by coding their residuals. In the example implementation of method 100, the layered coding is realized via a temporal predictive coding structure in JM.

If activities are not rendered at the thin clients, high quality graphics have to be fully rendered at the cloud servers, encoded and delivered to the clients as a video bitstream. As a performance benchmark, the high quality rendering animation is directly rendered as a video sequence using the AVC/H.264 codec (i.e. direct coding) to be used for comparison against the results of the example implementation of method 100. In the coding setting, IPPP is adopted as the coding structure for low latency.

The rate-distortion (RD) performance between the layered coding of the example implementation of method 100 and the direct coding is then compared. Distortion is measured as the final reconstructed visual quality at the client. FIGS. 16(a)-(d) respectively show the rate-distortion curves when the layered coding and the direct coding are used for rendering the Dolphin, Elfe, Lostride and Wormhole animations. As shown in FIGS. 16(a)-(d), the layered coding outperforms the direct coding (specifically, it has higher peak signal to noise ratios (PSNRs)) for the animations Dolphin, Elfe, Lostride and Wormhole. However, conventional direct coding marginally outperforms the layered coding at high bitrate for Elfe.

As direct coding codes the temporal residuals while the layered coding codes the residuals which are the differences between the high and low quality renderings, the amount of motion content in the animations affect how these two types of coding compare against each other. Among the animations, Lostride and Wormhole are of high motion, while Dolphin is of moderate motion and Elfe is of low motion. In high motion animations, information between frames is less temporally correlated. In such cases, the low quality images are better predictors for coding of the high quality images. Conversely, in low motion animations, there is a higher correlation of information content between frames. In this case, the temporal prediction of P frames may be more efficient, especially in the high bitrate domain as observed in FIG. 16(b) where the high bitrate allocation of previous frames serve as better predictors for coding of successive frames. However, since video games often contain high motion, the layered coding used in method 100 is more suitable for coding in video gaming.

In addition to the fine partitioning of the rendering pipeline that results in competitive rate distortion performances, the excellent rate distortion performance of layered coding in Wormhole is also due to the fact that there is a background comprising stars in the Wormhole animation. In particular, it is difficult to encode the stars background using direct coding, but with layered coding, the stars background can be rendered with a lower quality at the thin client and need not be included in the enhancement information layer. The layered coding works extremely well for an animation with a noisy background which is difficult to compress but can be easily rendered using the exact key for a random number generator.

Figure 17:
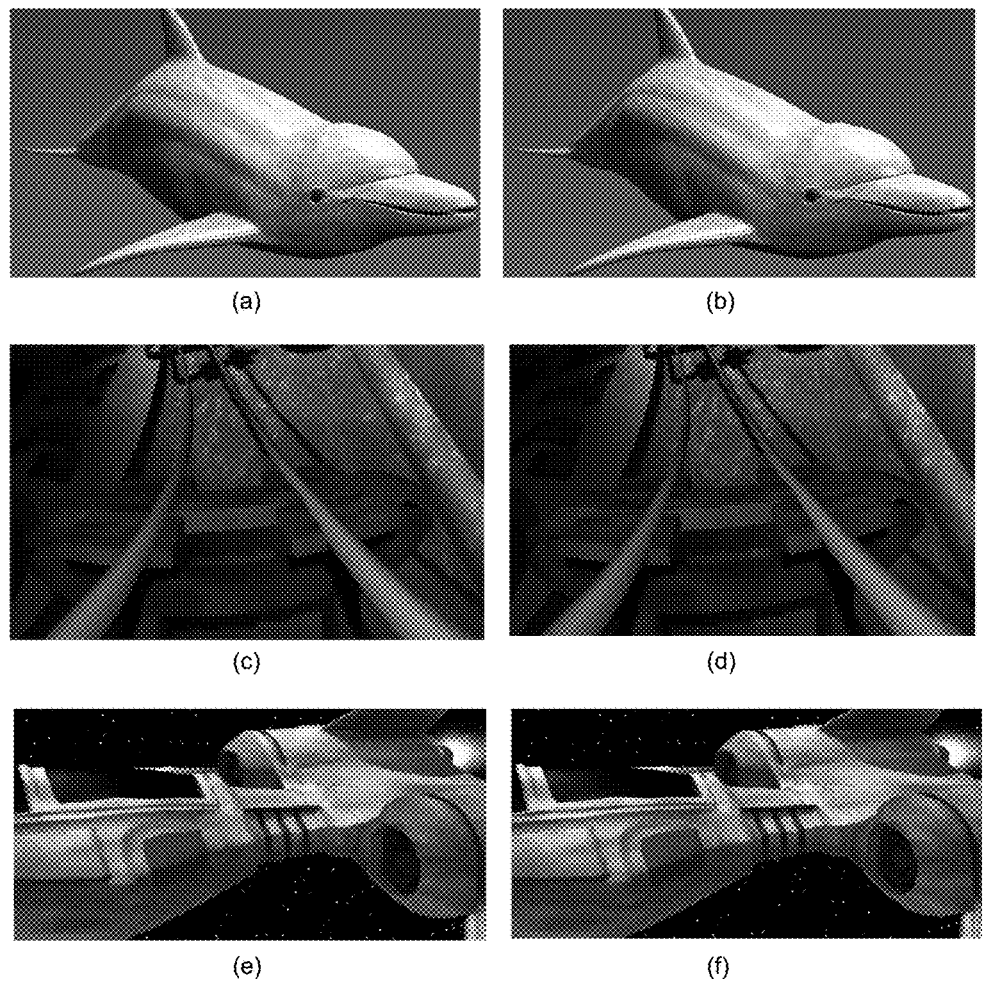
FIGS. 17(a)-(f) show reconstructed images of the Dolphin, Elfe, Lostride and Wormhole animations when layered coding and direct coding are used for rendering these animations.

FIGS. 17(a)-(f) show the reconstructed images of the animations, whereby the reconstructed images on the left are coded by direct coding and those on the right are obtained by layered coding in the example implementation of method 100. In particular, FIG. 17(a) shows the reconstructed image of the Dolphin using direct coding (this image has a PSNR of 46.17 dB and the coding requires a bitrate of 0.085 bits per pixel (bpp)), FIG. 17(b) shows the reconstructed image of the Dolphin using layered coding (this image has a PSNR of 46.64 dB and the coding requires a bitrate of 0.052 bpp), FIG. 17(c) shows the reconstructed image of the Lostride using direct coding (this image has a PSNR of 39.34 dB and the coding requires a bitrate of 0.173 bpp), FIG. 17(d) shows the reconstructed image of the Lostride using layered coding (this image has a PSNR of 42.29 dB and the coding requires a bitrate of 0.165 bpp), FIG. 17(e) shows the reconstructed image of the Wormhole using direct coding (this image has a PSNR of 40.95 dB and the coding requires a bitrate of 0.027 bpp) and FIG. 17(f) shows the reconstructed image of the Wormhole using layered coding (this image has a PSNR of 45.55 dB and the coding requires a bitrate of 0.024 bpp).

For the Dolphin animation, the layered coding scheme is able to code at an average bit rate 35% lower than the average bitrate of the direct coding scheme with indiscernible quality difference. For the Lostride and Wormhole animations, the layered coding scheme yields noticeable quality improvements over the direct coding scheme at a comparable bitrate. However, slight quality differences can be seen at the sharper rail supporter and background details in the Lostride animation and in the spaceship's body in the Wormhole animation.

5. Advantages

Embodiments of the present invention have several advantages, some of which are described below.

The challenges of cloud gaming include the requirements for high transmission bit-rates for the streaming of high-quality games, leading to bandwidth and latency challenges. This hinders the development of mobile cloud gaming over wireless networks. Increasingly, modern mobile devices have some rendering capability. For instance, some variants of the Samsung Galaxy S4 are equipped with the PowerVR tri-core SGX544MP3 GPU clocked at 533 MHz [23]. Embodiments of the present invention employ layered coding to leverage on the rendering capability of the mobile devices to reduce the transmission data bit-rate required between the cloud servers and the mobile devices. Specifically, embodiments of the present invention allow mobile devices/clients to render low-quality game images, or the base layer. The complexity of the base layer is low enough to allow the thin clients with limited computational complexity to generate it. Instead of sending high quality game images, cloud servers can simply transmit enhancement layer information to the clients to improve the quality of the base layer. The information content of the enhancement layer in the embodiments of the present invention is less than that of the high quality game image. Together, the base layer and the enhancement layer can depict a real-time networked multiple player gaming scenario. The layered coding used in the embodiments of the present invention thus helps to reduce the transmission bit-rate of game images. Comparing to standard H.264/AVC, experimental results suggest that layered coding can achieve up to 35 percent reduction in transmission bandwidth in game video sequences exhibiting moderate/rapid motions (which are fairly common in video games). Therefore, using embodiments of the present invention, high quality mobile cloud gaming can be achieved with only a fraction of transmission bandwidth of existing services.

In embodiments of the present invention, to generate the enhancement layer, the base layer serve as reference prediction frames in inter-frame coding of high quality images, and the compressed prediction residue as enhancement information. Unlike scalable video coding (SVC) [24], in embodiments of the present invention, there is no need to send the base layer as this base layer can be directly generated on the client upon receiving the compact rendering commands from the cloud server. Also, unlike SVC, inter-frame coding is used instead of inter-layer coding to compress the prediction residue, so as to leverage on existing cloud hardware compression engines. In contrast to the embodiments of the present invention, SVC or other layered video coding cannot achieve bitrate reduction. SVC or other layered video coding are used for content adaptation, such as adaptation to different client display size or required quality.

Different graphics rendering options can be used to generate the low-quality base layer, taking into account the compressibility of the corresponding enhancement information and the rendering capability of mobile devices. The rendering capability of the mobile devices is limited compared with cloud servers, and often it is undesirable to run the rendering at full capacity on the mobile devices which are power-constrained. With the embodiments of the present invention, it is possible to achieve considerable transmission bit-rate reduction with only a small amount of rendering performed by the clients.

The operation of cloud gaming platforms can in general be classified into two major categories, namely video streaming methods and graphics streaming methods. In video streaming methods [13, 8, 32], gaming logics and game graphic rendering are carried out at the cloud servers. The rendered images are encoded as video bitstream and transmitted to thin clients. GamingAnywhere [13] is a comprehensive cloud gaming platform which adopts the video streaming method. The platform renders game graphics at the cloud servers, and encodes the rendered images as video bitstreams using H.264/AVC. The video bitstreams are then transmitted via RTP to the clients for display. GamingAnywhere allows clients with minimal computation capability of video playback to experience graphic-rich gaming experience. As an open platform, GamingAnywhere is designed with high extensibility, portability, and reconfigurability for continuous improvements. Extensive evaluations [3] of GamingAnywhere demonstrated that the platform has good efficiency, responsiveness and visual quality. Wang et al. [32] has also investigated the rendering adaptation techniques that can dynamically adapt the graphic richness and complexity of rendering, depending on the network and cloud resources. These rendering adaptation techniques can be useful in the video streaming methods. In contrast, in graphics streaming methods [14, 9], rendering commands to graphic libraries (such as OpenGL and Direct3D) are intercepted, encoded and streamed to the client device for rendering. Thus, graphics streaming methods require the client devices to possess strong computational capability in order to render high quality graphics. Although with the recent advances in consumer electronics, several mobile devices are now equipped with GPU hardware, full rendering of high quality graphics may still be too demanding for these power-limited mobile devices. In the graphic streaming method [13, 8, 32] and local game consoles, the high quality game graphics are all rendered locally without extra information from servers for visual enhancement. Whereas, when game graphics are all rendered at remote servers as in the video streaming method [3], the information to be transmitted from the cloud server to the thin client is equivalent to the video bit-stream of game graphics. Both scenarios represent two extreme cases, where the former requires powerful computation capability at local devices while the latter requires high bandwidth connectivity with the remote servers. In contrast, embodiments of the present invention employ distributed rendering of game graphics.

Compared to the enhancement layer, the data-rate required to transmit rendering commands (camera positions, object motion parameters) are substantially lower. The low quality rendering in the embodiments of the present invention has a reduced rendering pipeline which requires less rendering commands and computations. The low-quality polygon meshes for low quality rendering can be sent infrequently to the client, as this is usually required only when the object model is to be updated. Kinematics and motions of a rigid mesh model can be pre-computed at the cloud servers and delivered to the thin client as translation/rotation matrices. These rendering commands constitute the traffic which is substantially lower than the enhancement layer bit-stream.

REFERENCES

[1] T. Akenine-Moller, T. Moller, and E. Haines. Real-Time Rendering. A. K. Peters, Ltd., Natick, Mass., USA, 2nd edition, 2002.
[2] Blender. www.blender.org.
[3] K.-T. Chen, Y.-C. Chang, H.-J. Hsu, D.-Y. Chen, C.-Y. Huang, and C.-H. Hsu. On the quality of service of cloud gaming systems. IEEE Transactions on Multimedia, 2014.
[4] Z. Chen, M. Li, and Y.-P. Tan. Perception-aware multiple scalable video streaming over wlans. Signal Processing Letters, IEEE, 17(7):675-678, 2010.
[5] W. Cheng, W. T. Ooi, S. Mondet, R. Grigoras, and G. Morin. Modeling progressive mesh streaming: Does data dependency matter? ACM Trans. Multimedia Comput. Commun. Appl., 7(2):10:1-10:24, March 2011.
[6] Cloud Gaming on Samsung Smart TV. http://gizmodo.com/5916101/samsung-cloud-gamingto-stream-console+quality-games-straight-to-smart-tvs. 2012.
[7] D. Cohen-Or, Y. Mann, and S. Fleishman. Deep compression for streaming texture intensive animations. In Proceedings of the 26th annual conference on Computer graphics and interactive techniques, SIGGRAPH '99, pages 261-267, New York, N.Y., USA, 1999. ACM Press/Addison-Wesley Publishing Co.
[8] D. De Winter, P. Simoens, L. Deboosere, F. De Turck, J. Moreau, B. Dhoedt, and P. Demeester. A hybrid thin-client protocol for multimedia streaming and interactive gaming applications. In Proceedings of the 2006 international workshop on Network and operating systems support for digital audio and video, NOSSDAV '06, pages 15:1-15:6, New York, N.Y., USA, 2006. ACM.
[9] P. Eisert and P. Fechteler. Low delay streaming of computer graphics. In Image Processing, 2008. ICIP 2008. 15th IEEE International Conference on, pages 2704-2707, 2008.
[10] N. Freris, C.-H. Hsu, J. Singh, and X. Zhu. Distortion-aware scalable video streaming to multinetwork clients. Networking, IEEE/ACM Transactions on, 21(2):469-481, 2013.
[11] W. Guan, J. Cai, J. Zhang, and J. Zheng. Progressive coding and illumination and view dependent transmission of 3-d meshes using r-d optimization. Circuits and Systems for Video Technology, IEEE Transactions on, 20(4):575-586, 2010.
[12] P. Heckbert. Survey of texture mapping. Computer Graphics and Applications, IEEE, 6(11):56-67, 1986.
[13] C.-Y. Huang, C.-H. Hsu, Y.-C. Chang, and K.-T. Chen. Gaminganywhere: an open cloud gaming system. In Proceedings of the 4th ACM Multimedia Systems Conference, MMSys '13, pages 36-47, New York, N.Y., USA, 2013. ACM.
[14] A. Jurgelionis, P. Fechteler, P. Eisert, F. Bellotti, H. David, J. Laulajainen, R. Carmichael, V. Poulopoulos, A. Laikari, P. Perala, A. D. Gloria, and C. Bouras. Platform for distributed 3d gaming. International Journal of Computer Games Technology, 2009(1):1-15, January 2009.
[15] D. Koller, M. Turitzin, M. Levoy, M. Tarini, G. Croccia, P. Cignoni, and R. Scopigno. Protected interactive 3d graphics via remote rendering. In ACM SIGGRAPH 2004 Papers, SIGGRAPH '04, pages 695-703, New York, N.Y., USA, 2004. ACM.
[16] M. Levoy. Polygon-assisted jpeg and mpeg compression of synthetic images. In Proceedings of the 22nd annual conference on Computer graphics and interactive techniques, SIGGRAPH '95, pages 21-28, New York, N.Y., USA, 1995. ACM.
[17] K. Mokhtarian and M. Hefeeda. Capacity management of seed servers in peer-to-peer streaming systems with scalable video streams. Multimedia, IEEE Transactions on, 15(1):181-194, 2013.
[18] T. Moon. The expectation-maximization algorithm. Signal Processing Magazine, IEEE, 13(6):47-60, 1996.
[19] NVIDIA GeForce GRID technology. http://www.nvidia.com/object/cloud-gaming.html.
[20] J. Peng, C.-S. Kim, and C. C. Jay Kuo. Technologies for 3d mesh compression: A survey. J. Vis. Comun. Image Represent., 16(6):688-733, December 2005.
[21] B. T. Phong. Illumination for computer generated pictures. Commun. ACM, 18(6):311-317, June 1975.
[22] D. Rogers, R. Earnshaw, B. C. S. C. Graphics, D. Group, and C. G. Society. Computer Graphics Techniques: Theory and Practice. Springer, 1990.
[23] Samsung Galaxy S4. http://en.wikipedia.org/wiki/Samsung Galaxy S4.

[24] H. Schwarz, D. Marpe, and T. Wiegand. Overview of the scalable video coding extension of the H.264/AVC standard. Circuits and Systems for Video Technology, IEEE Transactions on, 2007.
[25] S. Shi, C.-H. Hsu, K. Nahrstedt, and R. Campbell. Using graphics rendering contexts to enhance the real-time video coding for mobile cloud gaming. In Proceedings of the 19th ACM international conference on Multimedia, MM '11, pages 103-112, New York, N.Y., USA, 2011. ACM.
[26] A. Skodras, C. Christopoulos, and T. Ebrahimi. The jpeg 2000 still image compression standard. Signal Processing Magazine, IEEE, 18(5):36-58, 2001.
[27] Sony buys Gaikai cloud gaming service. http://www.engadget.com/2012/07/02/sony-buys¬gaikai/. 2012.
[28] Sony will launch cloud gaming service. http://www.engadget.com/2013/06/10/sony-will-launch-cloud-gaming-service-for-ps3-ps4-and-vita-in¬2/.
[29] G. J. Sullivan, J.-R. Ohm, W.-J. Han, and T. Wiegand. Overview of the high efficiency video coding (HEVC) standard. Circuits and Systems for Video Technology, IEEE Transactions on, 2012.
[30] H. Suzuki, S. Takeuchi, and T. Kanai. Subdivision surface fitting to a range of points. In Computer Graphics and Applications, 1999. Proceedings. Seventh Pacific Conference on, pages 158-167, 322, 1999.
[31] L. Wang, X. Wang, X. Tong, S. Lin, S. Hu, B. Guo, and H.-Y. Shum. View-dependent displacement mapping. ACM Trans. Graph., 22(3):334-339, July 2003.
[32] S. Wang and S. Dey. Adaptive mobile cloud computing to enable rich mobile multimedia applications. Multimedia, IEEE Transactions on, 15(4):870-883, 2013.
[33] T. Wiegand, G. Sullivan, G. Bjontegaard, and A. Luthra. Overview of the H.264/AVC video coding standard. Circuits and Systems for Video Technology, IEEE Transactions on, 13(7):560-576, July 2003.
[34] V. Wisslar. Illuminated Pixels: The Why, What, and How of Digital Lighting.
[35] S. Zhao, W. T. Ooi, A. Carlier, G. Morin, and V. Chervillat. 3d mesh preview streaming. In Proceedings of the 4th ACM Multimedia Systems Conference, MMSys '13, pages 178-189, New York, N.Y., USA, 2013. ACM.
[36] J. Pool, A. Lastra, and M. Singh. An energy model for graphics processing units. In Computer Design (ICCD), 2010 IEEE International Conference on, pages 409{416, 2010.

The invention claimed is:

1. A method for reducing data bandwidth between a cloud server and a thin client comprising:
   rendering a base layer image/video stream at the thin client,
   rendering a high quality layer image/video stream at the cloud server, the high quality layer image/video stream having a higher quality than the base layer image/video stream,
   rendering a duplicate of the base layer image/video stream at the cloud server,
   generating an enhancement layer image/video stream from the high quality layer image/video stream and the duplicate of the base layer image/video stream at the cloud server,
   transmitting the enhancement layer image/video stream from the cloud server to the thin client,
   displaying a composite layer image/video stream on the thin client, the composite layer image/video stream being based on the base layer image/video stream and the enhancement layer image/video stream;
   wherein rendering the base layer image/video stream comprises using one or more rendering techniques and wherein rendering parameters for the one or more rendering techniques are determined by minimizing information content of the enhancement layer, while satisfying a constraint that the rendering of the base layer image/video stream can be achieved with computation capability of the thin client.

2. The method in claim 1 wherein the thin client is a mobile device.

3. The method in claim 1 further comprising infrequently providing a plurality of 3D polygon models to the thin client during a session between the cloud server and the thin client.

4. The method in claim 3 comprising transmitting rendering commands for the polygon models in real time from the cloud server to the thin client to render the base layer.

5. The method in claim 3, wherein the polygon models are provided to the thin client only when the models at the thin client are to be updated during the session.

6. The method in claim 1, wherein generating the enhancement layer image/video stream comprises:
   compressing the high quality layer image/video stream with the cloud server base layer as a reference predictor frame, and
   generating the enhancement layer image/video stream from compressed prediction residue information between the cloud server base layer image/video stream and the high quality layer image/video stream.

7. The method in claim 6, wherein the high quality layer image/video stream is compressed using an inter-frame encoder.

8. The method in claim 1 wherein the enhancement layer image/video stream provides one or more of enhanced lighting, texture, shading and displacement mapping.

9. The method in claim 1 wherein rendering the base layer image/video stream comprises using a Gouraud shading algorithm and rendering the high quality layer comprises using a Phong shading algorithm.

10. The method in claim 1 wherein rendering the base layer image/video stream comprises using a Phong reflection model with a first number of light sources and rendering the high quality layer image/video stream comprises using a Phong reflection model with a second number of light sources, the second number of light sources being higher than the first number of light sources.

11. The method in claim 1 wherein rendering the base layer image/video stream comprises using a Phong reflection model with a first set of light sources and rendering the high quality layer image/video stream comprises using a Phong reflection model with a second set of light sources, the second set of light sources contributing less information content to the composite layer image/video stream than the first set of light sources.

12. The method in claim 11, wherein an amount of information content contributed by each light source to the composite layer image/video stream is determined based on intensity values of pixels in the composite layer image/video stream to be displayed.

13. The method in claim 12, wherein the amount of information content contributed by each light source to the composite layer image/video stream is determined based on the number of pixels with non-zero intensity values in the composite layer image/video stream to be displayed.

14. The method in claim 13, wherein the amount of information content contributed by each light source to the composite layer image/video stream is further determined based on a mean of the pixels' intensity values in the composite layer image/video stream to be displayed.

15. The method in claim 1 further comprising combining the base layer image/video stream and the enhancement layer image/video stream at the thin client to form the composite layer image/video stream.

16. The method in claim 1 wherein the base layer image/video stream and the enhancement layer image/video stream depict a real-time networked multiple player gaming scenario.

17. The method in claim 1, wherein the one or more rendering techniques comprise a Phong reflection model and wherein the rendering parameters comprise a number of components of the Phong reflection model.

18. The method in claim 17 wherein rendering the base layer comprises using the Phong reflection model with ambient and diffuse components and rendering the high quality layer image/video stream comprises using the Phong reflection model with ambient, diffuse and specular components.

19. The method in claim 17, wherein the number of components of the Phong reflection model is determined by minimizing a weighted sum of complexity of rendering the base layer image/video stream and the information content of the enhancement layer image/video stream, while satisfying the constraint that the rendering of the base layer image/video stream can be achieved with computation capability of the thin client.

20. The method in claim 1, wherein the one or more rendering techniques comprise a polygonal model and wherein the rendering parameters comprise a number of polygons of the polygonal model.

21. The method in claim 20, wherein rendering the base layer image/video stream comprises using a coarse polygonal model and rendering the high quality layer image/video stream comprises using a fine polygonal model, wherein the fine polygonal model comprises a higher number of polygons than the coarse polygonal model.

22. The method in claim 21 wherein rendering the base layer image/video stream comprises using between 5 - 20% of the number of polygons used for rendering the high quality layer image/video stream.

23. The method in claim 21 wherein rendering the base layer image/video stream comprises using approximately 10% of the number of polygons used for rendering the high quality layer image/video stream.

24. A thin client configured to facilitate performance of a method for reducing data bandwidth between a cloud server and the thin client comprising: a processor at the thin client configured to render a base layer image or video stream at the thin client, wherein a processor at the cloud server is configured to render a high quality layer image/video stream at the cloud server, the high quality layer image/video stream having a higher quality than the base layer image/video stream, wherein the processor at the could server is configured to render a duplicate of the base layer image/video stream at the cloud server, wherein the processor at the could server is configured to generate an enhancement layer image/video stream from the high quality layer image/video stream and the duplicate of the base layer image/video stream at the cloud server, wherein the could server is configured to transmit the enhancement layer image/video stream from the cloud server to the thin client, a display unit configured to display a composite layer image/video stream on the thin client, the composite layer image/video stream being based on the base layer image/video stream and the enhancement layer image/video stream; wherein the processor at the thin client is configured to render the base layer image/video stream comprises using one, or more rendering techniques and wherein rendering parameters for the one or more rendering techniques are determined by minimizing information content of the enhancement layer image/video stream, while satisfying a constraint that the rendering of the base layer image/video stream can be achieved with computation capability of the thin client.

25. A cloud server configured to facilitate performance of a method for reducing data bandwidth between the cloud server and a thin client comprising: a processor at the thin client configured to render a base layer image/video stream at the thin client, a processor at the could server configured to render a high quality layer image/video stream at the cloud server, the high quality layer image/video stream having a higher quality than the base layer image/video stream, the processor at the could server configured to render a duplicate of the base layer image/video stream at the cloud server, a processor at the could server configured to generate an enhancement layer image/video stream from the high quality layer image/video stream and the duplicate of the base layer image/video stream at the cloud server, the cloud server configured to transmit the enhancement layer image/video stream from the cloud server to the thin client, wherein a display unit at the thin client is configured to display a composite layer image/video stream on the thin client, the composite layer image/video stream being based on the base layer image/video stream and the enhancement layer image/video stream; wherein the processor at a thin client configured to render the base layer image/video stream comprises using one or more rendering techniques and wherein rendering parameters for the one or more rendering techniques are determined by minimizing information content of the enhancement layer image/video stream, while satisfying a constraint that the rendering of the base layer image/video stream can be achieved with computation capability of the thin client.

26. An apparatus comprising:
a processor configured to render a base layer image/video stream,
a receiver configured to receive an enhancement layer image/video stream from a cloud server, having higher computational capability than the apparatus, the enhancement layer image/video stream being generated from a high quality layer image/video stream and a duplicate of the base layer image/video stream at the cloud server, the high quality layer image/video stream and the duplicate of the base layer image/video stream being rendered at the cloud server and the high quality layer image/video stream having a higher quality than the base layer image/video stream; and
a display unit configured to display a composite layer image/video stream on the apparatus, the composite layer image/video stream being based on the base layer image/video stream and the enhancement layer image/video stream;
wherein rendering the base layer image/video stream comprises using one or more rendering techniques and wherein rendering parameters for the one or more rendering techniques are determined by minimizing information content of the enhancement layer image/video stream, while satisfying a constraint that the rendering of the base layer image/video stream can be achieved with computation capability of the processor.

27. A cloud server comprising:
a processor configured to render a high quality layer image/video stream and a duplicate base layer image/ video stream, the duplicate base layer image/video stream being a duplicate of a base layer image/video stream that has been rendered at a thin client, wherein the high quality layer image/video stream has a higher quality than the base layer image/video stream and wherein the processor is further configured to generate an enhancement layer image/video stream from the high quality layer image/video stream and the duplicate base layer image/video stream, and a transmitter configured to transmit the enhancement layer image/video stream to the thin client having lower computational capability than the cloud server;

wherein the base layer image/video stream is rendered at the thin client using one or more rendering techniques and wherein rendering parameters for the one or more rendering techniques are determined by minimizing information content of the enhancement layer image/video stream, while satisfying a constraint that the rendering of the base layer image/video stream can be achieved with computation capability of the thin client.

28. An apparatus for reducing data bandwidth between a cloud server and a thin client, wherein the thin client comprises:

a thin client processor configured to render a base layer image/video stream, a receiver configured to receive an enhancement layer image/video stream from the cloud server having higher computational capability than the apparatus, the enhancement layer image/video stream being generated from a high quality layer image/video stream and a duplicate of the base layer image/video stream at the cloud server, the high quality layer image/video stream and the duplicate of the base layer image/video stream being rendered at the cloud server and the high quality layer image/video stream having a higher quality than the base layer image/video stream; and a display unit configured to display a composite layer image/video stream on the apparatus, the composite layer image/video stream being based on the base layer image/video stream and the enhancement layer image/video stream;

and the cloud server comprises:

a cloud server processor configured to render the high quality layer image/video stream and the duplicate of the base layer image/video stream, wherein the high quality layer image/video stream has a higher quality than the base layer image/video stream and wherein the cloud server processor is further configured to generate the enhancement layer image/video stream from the high quality layer image/video stream and the duplicate of the base layer image/video stream, and a transmitter configured to transmit the enhancement layer image/video stream to the thin client having lower computational capability than the cloud server;

wherein rendering the base layer image/video stream comprises using one or more rendering techniques and wherein rendering parameters for the one or more rendering techniques are determined by minimizing information content of the enhancement layer image/video stream, while satisfying a constraint that the rendering of the base layer image/video stream can be achieved with computation capability of the thin client processor.

29. A method for reducing data bandwidth between a cloud server and a thin client comprising:

rendering a base layer image/video stream at the thin client, transmitting an enhancement layer image/video stream from the cloud server to the thin client, displaying a composite layer image/video stream on the thin client, the composite layer image/video stream being based on the base layer image/video stream and the enhancement layer image/video stream, infrequently providing a plurality of 3D polygon models to the thin client during a session between the cloud server and the thin client;

wherein rendering the base layer image/video stream comprises using one or more rendering techniques and wherein rendering parameters for the one or more rendering techniques are determined by minimizing information content of the enhancement layer image/video stream, while satisfying a constraint that the rendering of the base layer image/video stream can be achieved with computation capability of the thin client.

* * * * *